US011869236B1

(12) United States Patent
Callari

(10) Patent No.: US 11,869,236 B1
(45) Date of Patent: Jan. 9, 2024

(54) GENERATING DATA FOR TRAINING VISION-BASED ALGORITHMS TO DETECT AIRBORNE OBJECTS

(71) Applicant: Amazon Technologies, Inc., Seattle, WA (US)

(72) Inventor: Francesco Giuseppe Callari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 367 days.

(21) Appl. No.: 17/000,561

(22) Filed: Aug. 24, 2020

(51) Int. Cl.
| | |
|---|---|
| G06V 20/17 | (2022.01) |
| G06N 20/00 | (2019.01) |
| G06F 16/583 | (2019.01) |
| G06V 10/75 | (2022.01) |
| G06V 20/10 | (2022.01) |
| G06V 20/64 | (2022.01) |
| G06F 18/214 | (2023.01) |

(52) U.S. Cl.
CPC ............ *G06V 20/17* (2022.01); *G06F 16/583* (2019.01); *G06F 18/214* (2023.01); *G06N 20/00* (2019.01); *G06V 10/751* (2022.01); *G06V 20/10* (2022.01); *G06V 20/64* (2022.01)

(58) Field of Classification Search
CPC ...... G06V 20/13; G06V 10/751; G06V 20/10; G06V 20/64; G06F 16/583; G06K 9/6256; G06N 20/00
See application file for complete search history.

(56) References Cited

U.S. PATENT DOCUMENTS

| 2011/0044543 A1 | 2/2011 | Nakamura et al. |
| 2017/0116735 A1* | 4/2017 | Aughey ............... G06V 20/647 |
| 2019/0164007 A1 | 5/2019 | Liu et al. |
| 2019/0258878 A1 | 8/2019 | Koivisto et al. |
| 2021/0092306 A1* | 3/2021 | Zhou ...................... H04N 23/69 |

(Continued)

OTHER PUBLICATIONS

Yellapantula, Sudha Ravali. Synthesizing realistic data for vision based drone-to-drone detection. Diss. Virginia Tech, 2019. (Year: 2019).*

(Continued)

*Primary Examiner* — Amandeep Saini
*Assistant Examiner* — Denise G Alfonso
(74) *Attorney, Agent, or Firm* — Athorus, PLLC

(57) ABSTRACT

Data for training a machine learning algorithm to detect airborne objects is generated by capturing background images using a camera aboard an aerial vehicle, and generating a trajectory of a synthetic object, such another aerial vehicle, in three-dimensional space. The trajectory is projected into an image plane of the camera, determined from a pose of the camera calculated using inertial measurement unit data captured by the aerial vehicle. Images of the synthetic object may be rendered based on locations of the trajectory in the image plane at specific times. Pixel-accurate locations for the rendered images may be determined by calculating a homography from consecutive images captured using the camera, and adjusting locations of the trajectory using the homography. The rendered images may be blended into the images captured by the camera at such locations, and used to train a machine learning algorithm.

20 Claims, 20 Drawing Sheets

(56) References Cited

U.S. PATENT DOCUMENTS

2021/0383616 A1* 12/2021 Rong .................. G06T 3/0093

OTHER PUBLICATIONS

Park, J. S., Sung, M. Y., & Noh, S. R., "Virtual object placement in video for augmented reality.", 2005, Springer Berlin Heidelberg, Advances in Multimedia Information Processing-PCM 2005: 6th Pacific Rim Conference on Multimedia Nov. 13-16, 2005, Proceedings, Part 1 6 (pp. 13-24) (Year: 2005).*

Fischler, M. and Bolles, R., "Random Sample Consensus: A Paradigm for Model Fitting with Applications to Image Analysis and Automated Cartography," Communications of the ACM, vol. 24, No. 6, pp. 381-395, 1981, 15 pages.

Lucas, B.D. and Kanade, T., "An Iterative Image Registration Technique with An Application to Stereo Vision," in Proceedings of the 7th International Joint Conference on Artificial Intelligence—vol. 2, IJCAI'81, (San Francisco, CA, USA), pp. 674-679, Morgan Kaufmann Publishers Inc., 1981, 6 pages.

Shi, J. and Tomasi, C., "Good Features to Track," in IEEE CVPR, pp. 593-600, 1994, 8 pages.

* cited by examiner

SYNTHETIC OBJECT

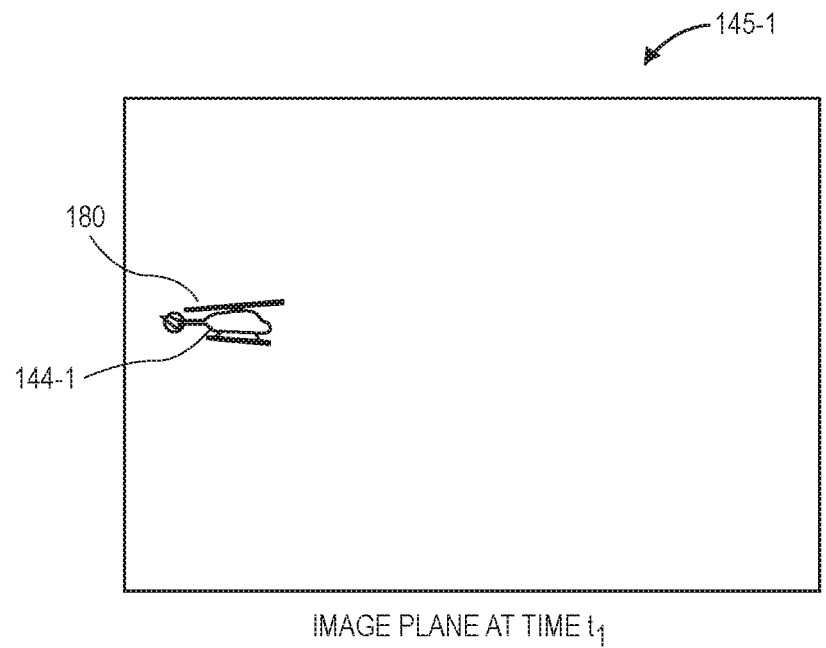
IMAGE PLANE AT TIME $t_1$
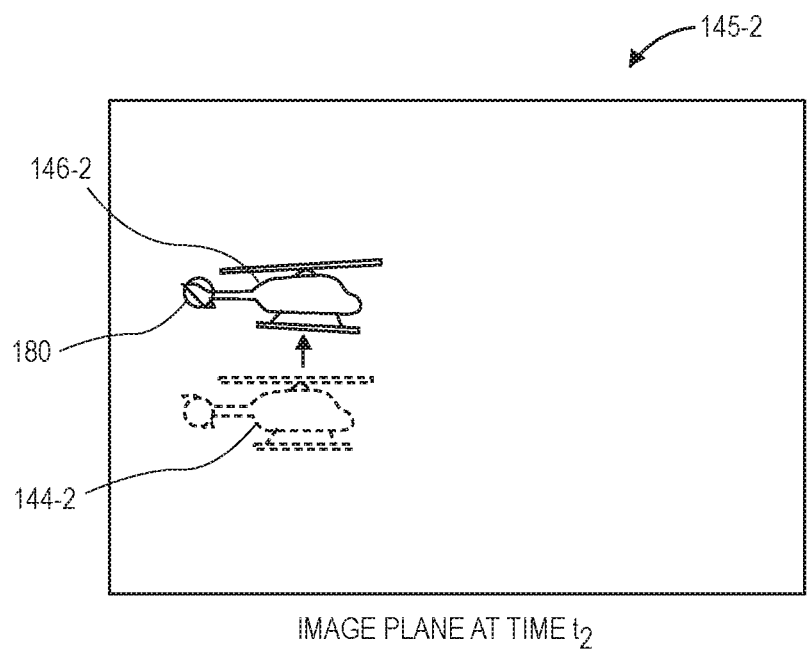
IMAGE PLANE AT TIME $t_2$
FIG. 1E

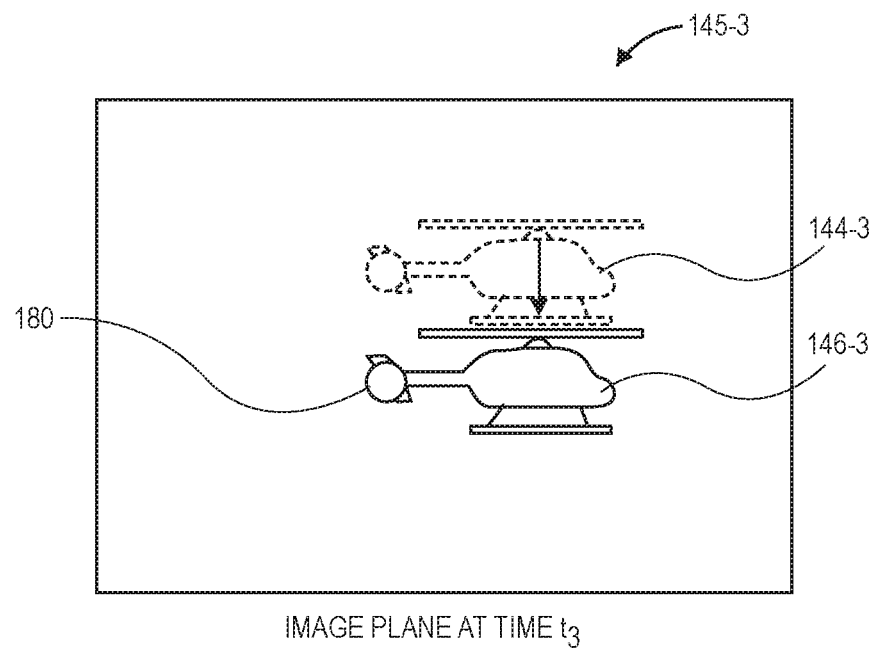
IMAGE PLANE AT TIME $t_3$
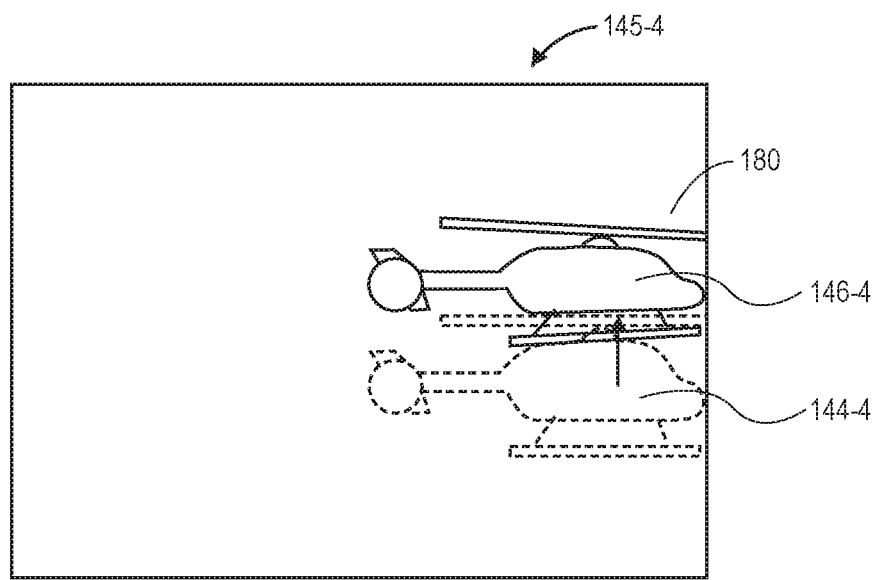
IMAGE PLANE AT TIME $t_4$
FIG. 1F

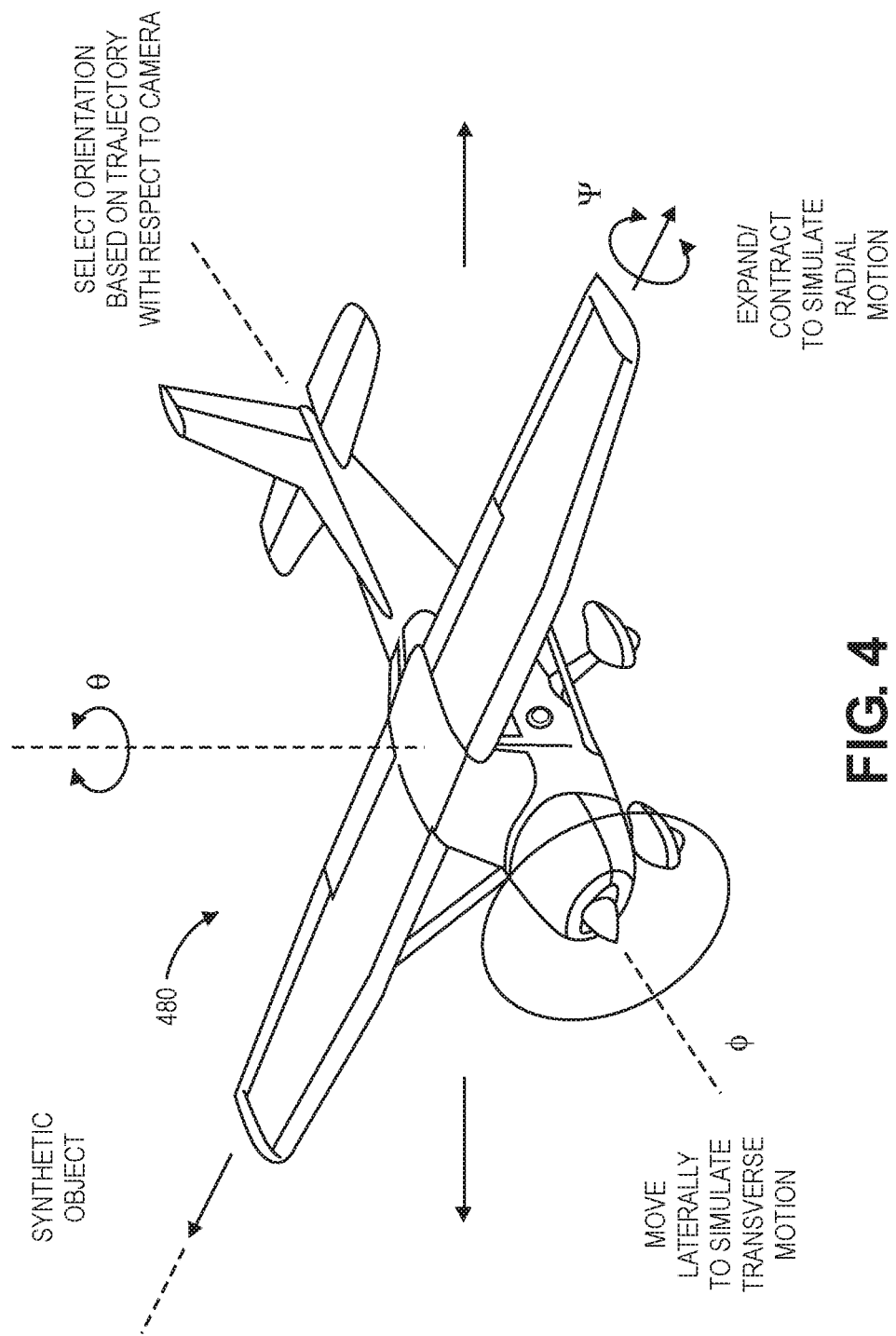

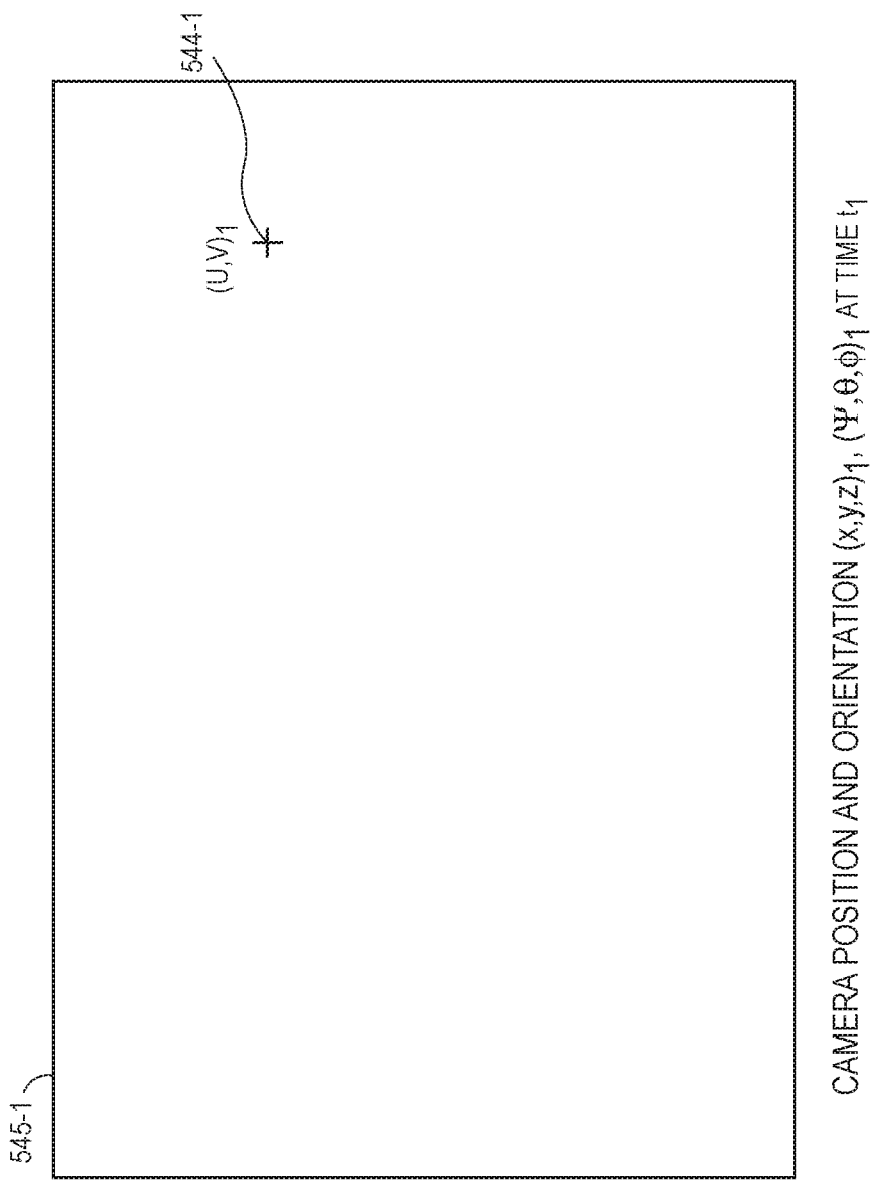

GENERATING DATA FOR TRAINING VISION-BASED ALGORITHMS TO DETECT AIRBORNE OBJECTS

BACKGROUND

Aerial vehicles (such as unmanned aerial vehicles, e.g., "UAV," or drones) having one or more propellers are commonly utilized in a variety of applications. Such vehicles may include fixed-wing aircraft, rotary wing aircraft or other vertical take-off and landing (or VTOL) aircraft having one or more propulsion motors and/or control surfaces.

Many aerial vehicles are outfitted with inertial measurement units or inertial navigation systems that measure linear and/or angular motion of the aerial vehicles, and enable an aerial vehicle to calculate adjustments that may be necessary in order to maintain the aerial vehicle at a desired altitude, on a desired course or in a desired angular orientation. Many aerial vehicles are also outfitted with one or more sensors, such as digital cameras or other imaging devices to aid in capturing data during operations, and computer processors or other machines to process data that is captured by such sensors. For example, images captured by cameras onboard an operating aerial vehicle are sometimes provided to a machine learning algorithm, system or technique that is trained to detect and identify any objects depicted within such images, or to determine whether any of such objects constitutes a threat to the aerial vehicle.

The accuracy of such algorithms, systems or techniques in detecting, identifying or evaluating objects depends on the extent to which such algorithms, systems or techniques are properly trained, and the quality of the data that is used to train such algorithms, systems or techniques. In some instances, aerial vehicles outfitted with cameras are operated near one another, e.g., on courses and at speeds, or in patterns, that cause the aerial vehicles to travel near one another. Imaging data captured by such cameras is then annotated and used to train machine learning algorithms, systems or techniques to detect vehicles against backgrounds of imaging data. Where aerial vehicles are comparatively small in size, e.g., UAV or drones, one aerial vehicle occupies only a small portion of a field of view of a camera provided aboard another aerial vehicle, as the aerial vehicles approach one another, and only for a brief period of time. As a result, most of the imaging data captured by cameras provided aboard aerial vehicles as the aerial vehicles approach one another typically fails to depict aerial vehicles that may be detected against backgrounds of such imaging data. Yet because aerial vehicles are configured to travel and are not stationary, imaging data captured by cameras provided aboard the aerial vehicles will depict substantially large variations in backgrounds or background features. Therefore, because a machine learning algorithm, system or technique is expected to detect aerial vehicles against a wide variety of backgrounds in imaging data, the machine learning algorithm, system or technique should be exposed to such backgrounds during a training process.

BRIEF DESCRIPTION OF THE DRAWINGS

FIGS. 1A through 1H are views of aspects of one system for generating training data in accordance with embodiments of the present disclosure.

FIG. 4 is a view of aspects of one system for generating training data in accordance with embodiments of the present disclosure.

FIGS. 5A through 5E are views of aspects of one system for generating training data in accordance with embodiments of the present disclosure.

DETAILED DESCRIPTION

As is set forth in greater detail below, the present disclosure is directed to generating data for training vision-based machine learning algorithms, systems or techniques to detect, identify and/or evaluate airborne objects depicted within imaging data. More specifically, the present disclosure is directed to capturing sequences of images by an aerial vehicle in flight, and determining positions and orientations of a camera that captured the images based on data captured by one or more inertial measurement components provided aboard the aerial vehicle. Images of another object, such as another aerial vehicle, may be synthetically rendered within the images captured by the aerial vehicle, e.g., by computer graphics techniques that may be known to those of ordinary skill in the pertinent arts, in order to simulate the presence and motion of the object within such images against backgrounds of such images. Subsequently, inaccuracies in the positions and the orientations of the camera, as determined from the data captured by the inertial measurement components, may be addressed by modeling the motion of background features using a homography (e.g., a homography matrix) between a pair of image planes at consecutive or successive times, estimated based on a pair of images captured at the consecutive or successive times, or in any other manner.

Figure 1A:
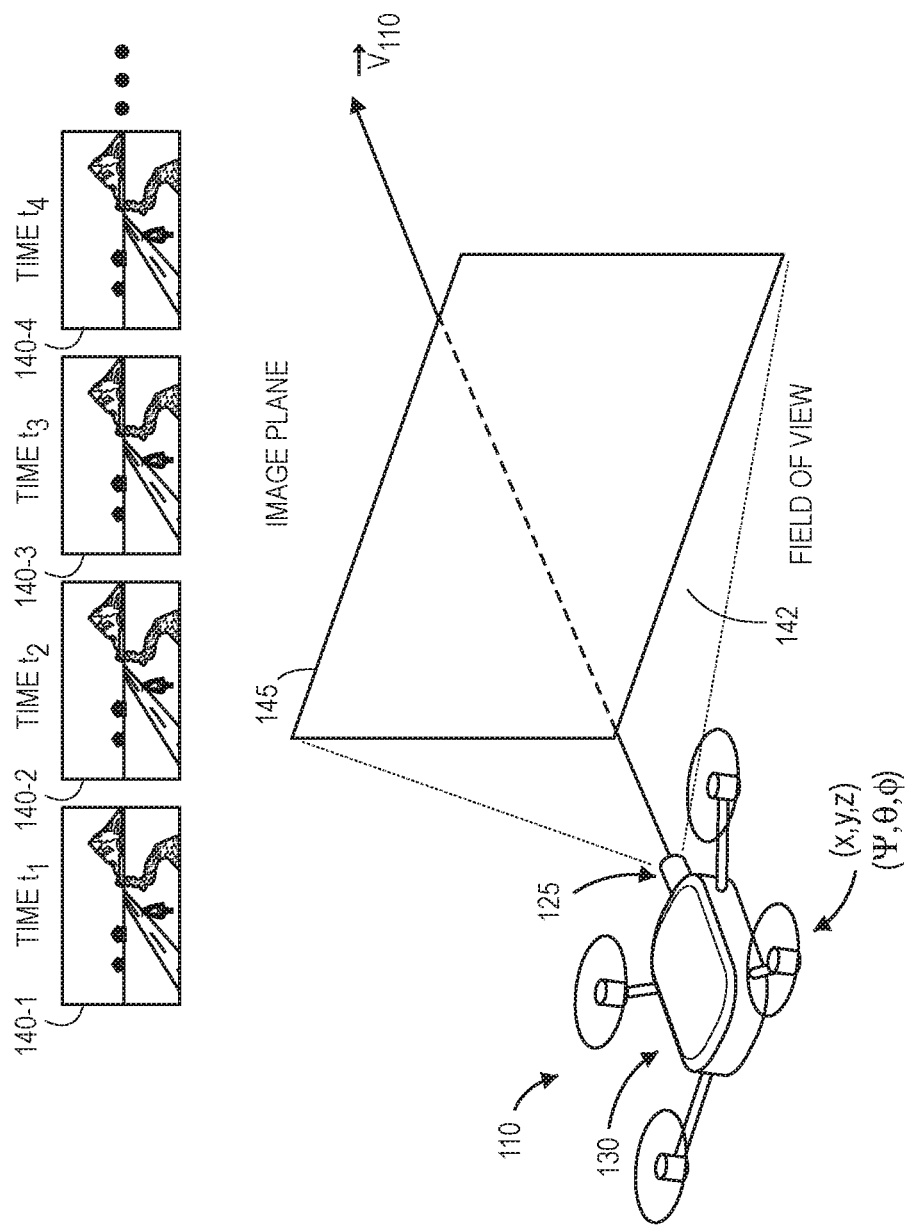

As is shown in FIG. 1A, the system includes an aerial vehicle 110 traveling at a velocity $V_{110}$. The aerial vehicle 110 includes a camera 125 (or another imaging device) and an inertial measurement unit 130 having a plurality of sensors thereon, such as one or more gyroscopes, accelerometers, magnetometers (e.g., compasses) and position sensors. Data captured by the inertial measurement unit 130 is used to determine a position (x, y, z) and an orientation ($\varphi$, $\theta$, $\phi$) of the aerial vehicle 110 in flight on a regular basis or at a predetermined frequency. The position (x, y, z) may include a latitude and a longitude, e.g., (x, y), as well as an altitude z, or may be defined with respect to any other absolute or relative coordinate system in three-dimensional space. Likewise, the orientation ($\varphi$, $\theta$, $\phi$) may include a yaw angle, a pitch angle, and a roll angle, or any equivalent representation of three-dimensional rotation, such as a quarternion or an axis an angle, or an orthogonal matrix, and may be defined with respect to any other absolute or relative coordinate system in three-dimensional space.

The camera 125 is aligned in a forward orientation with respect to a direction of travel of the aerial vehicle 110. The camera 125 has a field of view 142 extending forward of the camera 125 and defines an image plane 145. A sequence of images 140-1, 140-2, 140-3, 140-4 captured by the camera 125 at times $t_1$, $t_2$, $t_3$, $t_4$ is shown.

Figure 1B:
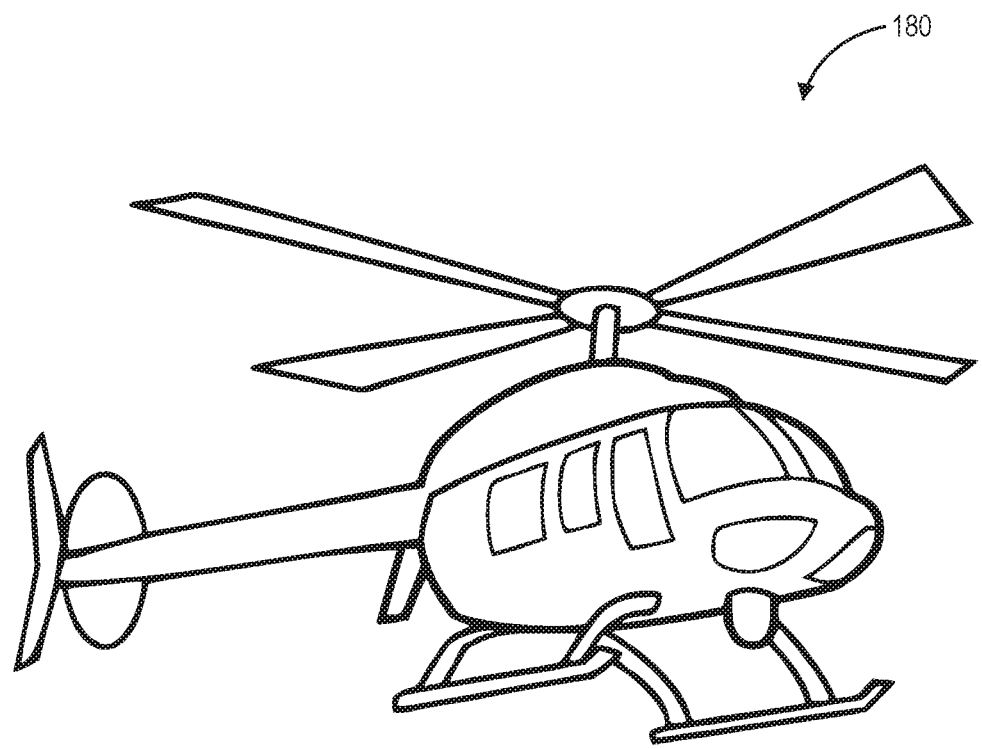
Figure 1C:
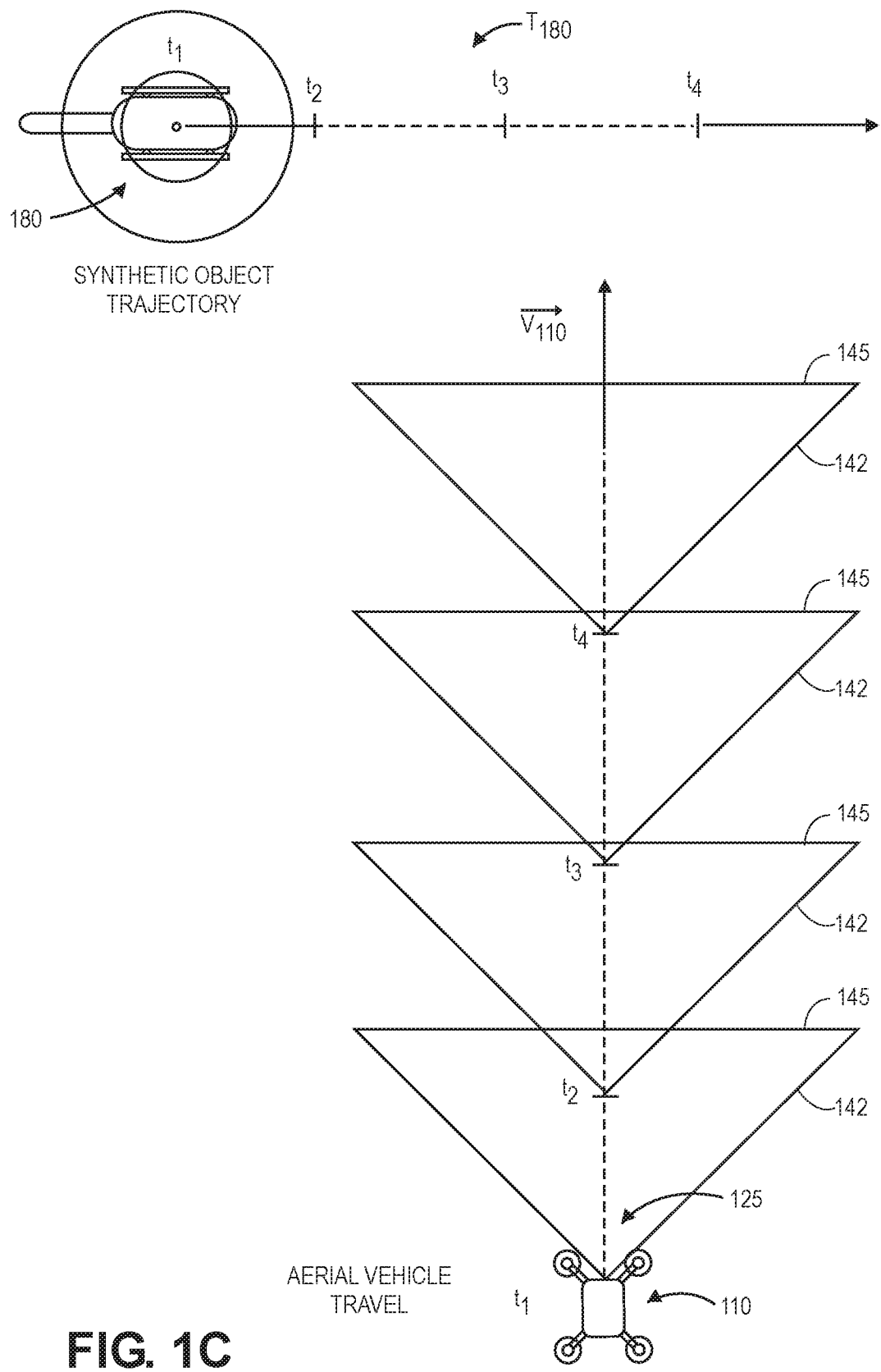

In accordance with embodiments of the present disclosure, images for training a machine learning algorithm may be generated by modifying images captured by the camera 125 to include a synthetic object rendered therein, in locations within such images corresponding to a trajectory of travel of the synthetic object. As is shown in FIG. 1B, the synthetic object 180 may be another aerial vehicle (viz., a helicopter), or any other airborne object, such as a bird. As is shown in FIG. 1C, a trajectory $T_{180}$ of the synthetic object 180 with respect to the actual travel of the aerial vehicle 110 is selected. For example, the trajectory $T_{180}$ includes a series of points in three-dimensional space at which the synthetic object 180 is to appear located at times $t_1$, $t_2$, $t_3$, $t_4$. In order to simulate the appearance of the synthetic object 180 within images captured by the camera 125, the points of the trajectory $T_{180}$ lie within the field of view 142 at times $t_1$, $t_2$, $t_3$, $t_4$.

Figure 1D:
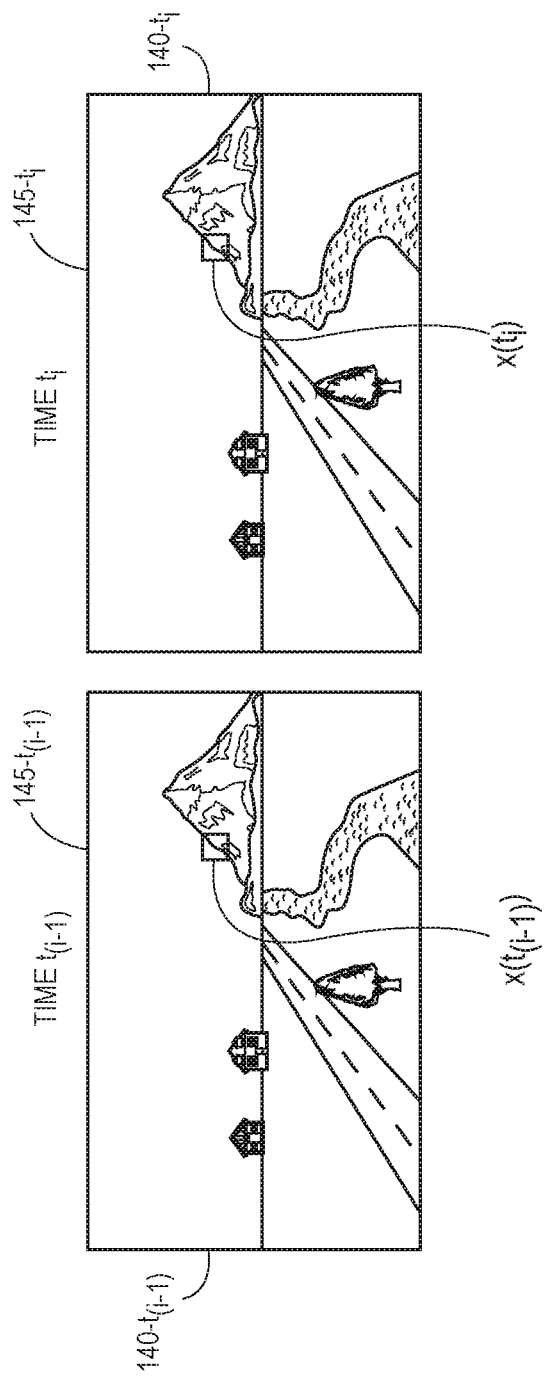

As is shown in FIG. 1D, a homography that relates portions of image planes 145-$t_{(i-1)}$, 145-$t_i$ at consecutive or successive times $t_{(i-1)}$, $t_i$ may be estimated by identifying locations of pixels appearing in consecutive images captured by the camera 125 at the consecutive or successive times $t_{(i-1)}$, $t_i$. The homography may be calculated and used to adjust locations of points of the trajectory $T_{180}$ within the image planes 145-$t_{(i-1)}$, 145-$t_i$ of the camera 125 at times $t_{(i-1)}$, $t_i$ at which the images were captured. For example, a homography H(t) that relates a location of each pixel x($t_i$) of an image plane 145-$t_i$ at time $t_i$ to a location of each pixel x($t_{(i-1)}$) of an image plane 145-$t_{(i-1)}$ at time $t_{(i-1)}$ may be estimated based on the locations of pixels depicting common portions of images 140-$t_i$, 140-$t_{(i-1)}$ captured at time $t_i$ and at time $t_{(i-1)}$. In some embodiments, the pixels may depict static, ground-based features that are depicted within each of the images 140-$t_i$, 140-$t_{(i-1)}$, such as ground surfaces, hills, mountains, structures, towers or other features appearing within consecutively or successively captured images.

In some embodiments, a homography may be estimated for each of the pixels of image planes 145-$t_{(i-1)}$, 145-$t_i$ that appear within both of a pair of consecutive images 140-$t_{(i-1)}$, 140-$t_i$. In some embodiments, a homography may be calculated for fewer than all of such pixels. For example, a homography may be estimated for each of a plurality of pixels within a vicinity of locations corresponding to points of the trajectory $T_{180}$ at such times.

As is shown in FIGS. 1E and 1F, rendered images of the synthetic object 180 may be generated, e.g., according to one or more computer graphics methods or techniques, based on the trajectory $T_{180}$ and the position and orientation of the camera 125, and placed in locations within the image plane of the camera 125. For example, as is shown in FIG. 1E, an original location 144-1 of the synthetic object 180 within the image plane 145-1 at the time $t_1$ may be selected based on the intrinsic properties of the camera 125 and a point in three-dimensional space on the trajectory $T_{180}$ at the time $t_1$, which may be projected into the image plane 145-1 by a camera matrix. Similarly, as is also shown in FIG. 1E, an original location 144-2 of the synthetic object 180 within the image plane 145-2 at the time $t_2$ may be selected based on the intrinsic properties of the camera 125 and a point in three-dimensional space on the trajectory $T_{180}$ at the time $t_2$, which may be projected into the image plane 145-2 by a camera matrix. Subsequently, an adjusted location 146-2 of the synthetic object 180 at the time $t_2$ may be determined based on an adjustment term (or adjustment factor, or adjustment vector) calculated based on the homography estimated for the image planes 145-1, 145-2 and an apparent velocity of one or more pixels of the synthetic object 180 in consecutive images 140-1, 140-2 captured at the time $t_i$ and the time $t_2$.

Likewise, as is shown in FIG. 1F, an original location 144-3 of the synthetic object 180 within the image plane 145-3 at the time $t_3$ may be determined based on the intrinsic properties of the camera 125 and a point in three-dimensional space on the trajectory $T_{180}$ at the time $t_3$, which may be projected into the image plane 145-3 by a camera matrix. An adjusted location 146-3 of the synthetic object 180 at the time $t_3$ may be selected based on an adjustment term calculated based on the homography estimated for the image planes 145-2, 145-3 and an apparent velocity of one or more pixels of the synthetic object 180 in consecutive images 140-2, 140-3 captured at the time $t_2$ and the time $t_3$. An original location 144-4 of the synthetic object 180 within the image plane 145-4 at the time $t_4$ may be determined based on the intrinsic properties of the camera 125 and a point in three-dimensional space on the trajectory $T_{180}$ at the time $t_4$, which may be projected into the image plane 145-4 by a camera matrix. An adjusted location 146-4 of the synthetic object 180 at the time $t_4$ may also be selected based on an adjustment term calculated based on the homography estimated for the image planes 145-3, 145-4 and an apparent velocity of one or more pixels of the synthetic object 180 in consecutive images 140-3, 140-4 captured at the time $t_3$ and the time $t_4$.

Figure 1G:
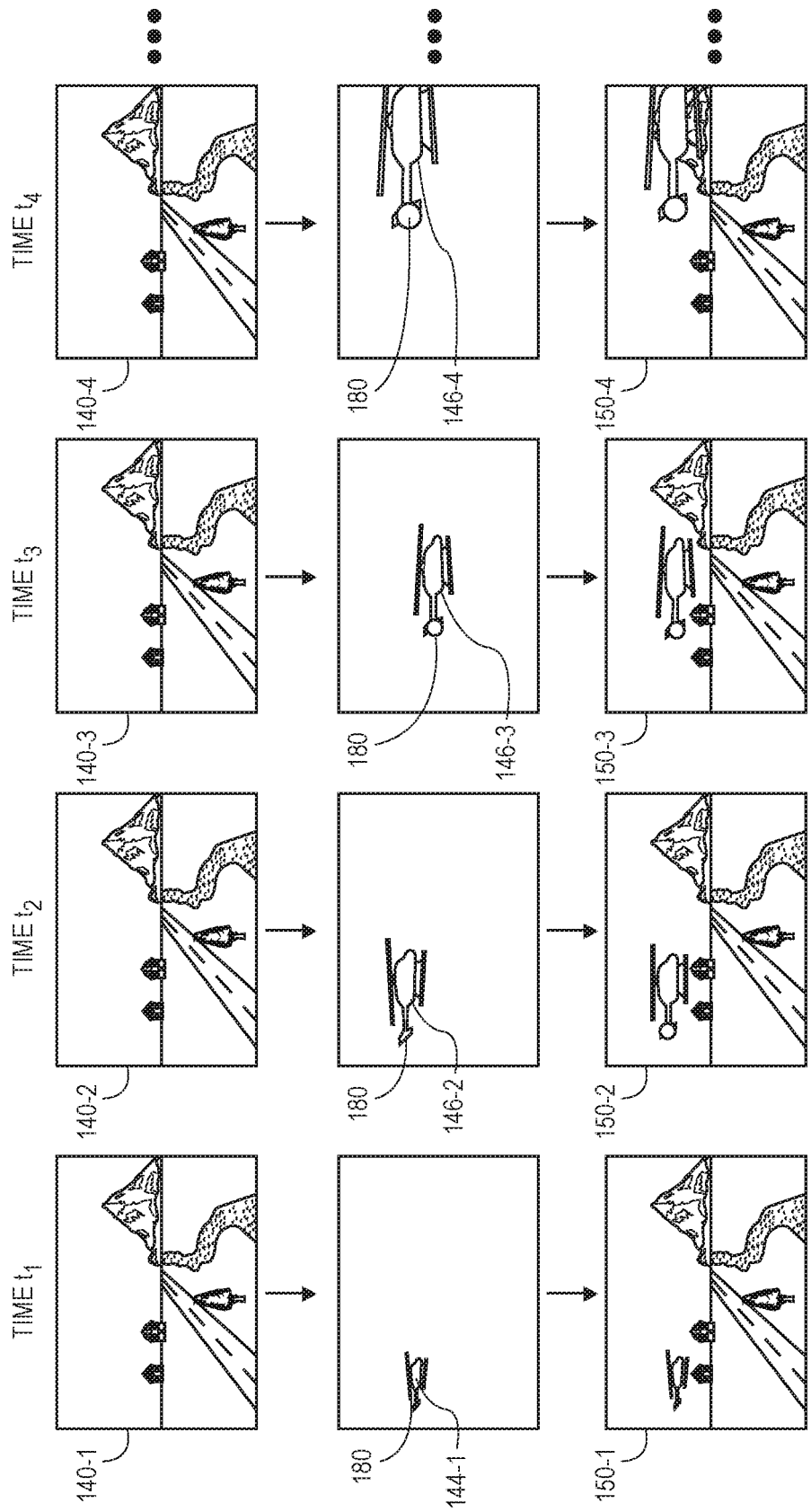

As is shown in FIG. 1G, a plurality of blended images 150-1, 150-2, 150-3, 150-4 may be generated by compositing the background images 140-1, 140-2, 140-3, 140-4 captured at the times $t_1$, $t_2$, $t_3$, $t_4$ as shown in FIG. 1A with the rendered images of the synthetic object 180 within the image planes 145-1, 145-2, 145-3, 145-4 at the times $t_1$, $t_2$, $t_3$, $t_4$, as shown in FIGS. 1E and 1F. The blended images 150-1, 150-2, 150-3, 150-4 may be composited by alpha-blending or any other technique that results in a photorealistic view of the background images 140-1, 140-2, 140-3, 140-4 with the synthetic object 180 traveling along the trajectory $T_{180}$ shown in FIG. 1C. As is shown in FIG. 1G, the synthetic object 180 is depicted at the original location 144-1 in the blended image 150-1, and in the adjusted locations 146-2, 146-3, 146-4 in the blended images 150-2, 150-3, 150-4.

Figure 1H:
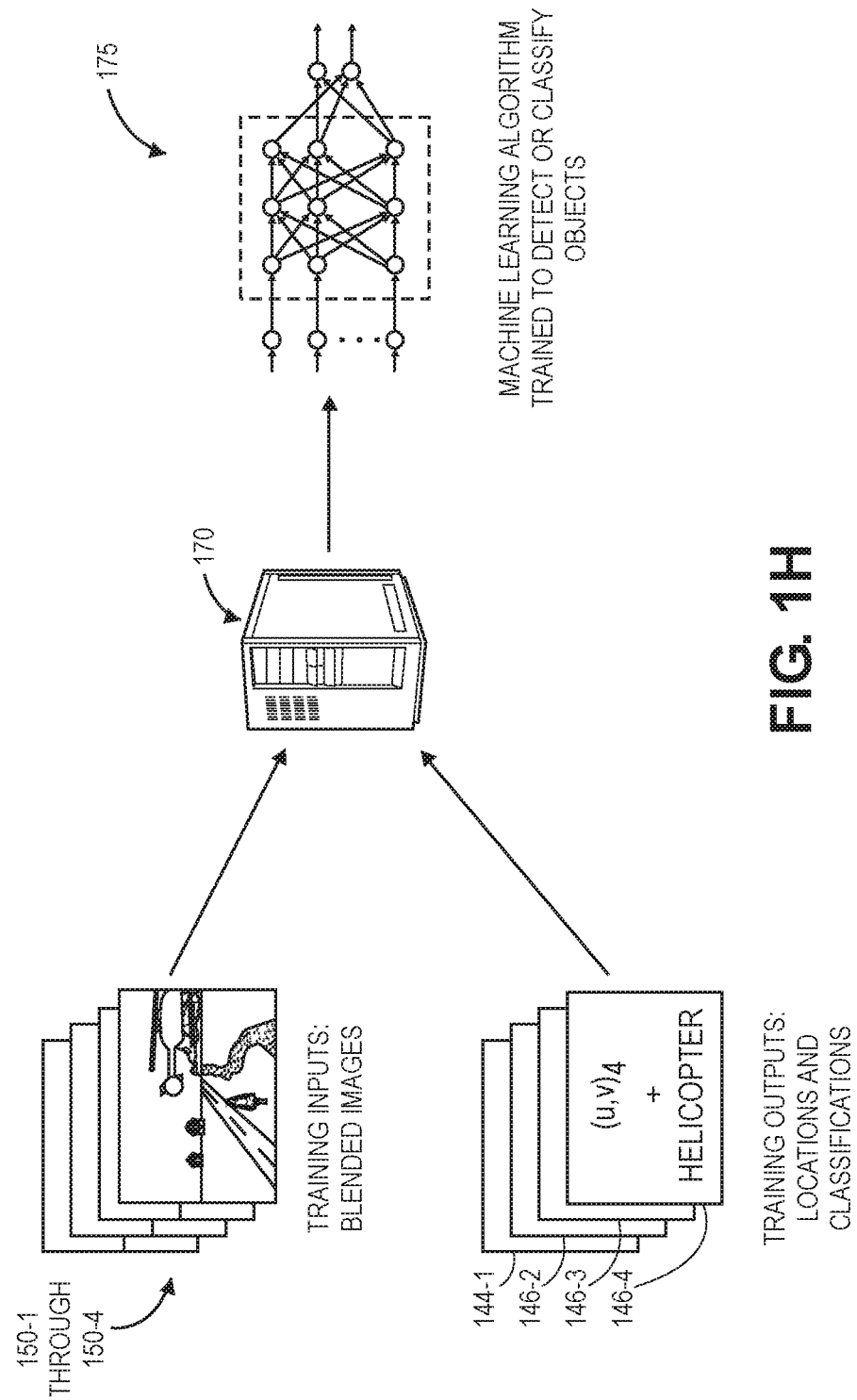

As is shown in FIG. 1H, the blended images 150-1, 150-2, 150-3, 150-4 and the original location 144-1 and adjusted locations 146-2, 146-3, 146-4 may be used by a computer device or system 170 to train a machine learning algorithm 175 to detect and classify objects, viz., the synthetic object 180, or an authentic object having one or more attributes in common with the synthetic object 180. For example, in some embodiments, the blended images 150-1, 150-2, 150-3, 150-4 may be provided to the machine learning algorithm 175 as training inputs, e.g., in a supervised manner, and a set of outputs received from the machine learning algorithm 175 may be compared to a set of training outputs including the original location 144-1 and adjusted locations 146-2, 146-3, 146-4. Alternatively, in some embodiments, the blended images 150-1, 150-2, 150-3, 150-4 may be provided to the machine learning algorithm 175 as training inputs, e.g., in an unsupervised manner. The machine learning algorithm 175 may include one or more artificial neural networks (e.g., convolutional neural networks) that are trained to map pixels of inputted imaging data to desired outputs by adjusting strengths of connections between one or more neurons, which are sometimes called synaptic weights, and may have any number of layers, e.g., an input layer, an output layer, and any number of intervening hidden layers. Alternatively, the machine learning algorithm 175 may be any other type or form of machine learning algorithm, system or technique.

In accordance with embodiments of the present disclosure, the accuracy and precision of the machine learning algorithm 175 may be enhanced because the locations at which the rendered images of the synthetic object 180 are blended into the background images 140-1, 140-2, 140-3, 140-4 in generating the blended images 150-1, 150-2, 150-3, 150-4 are more accurately determined by adjusting locations determined using data captured by the inertial measurement unit 130 based on homographies estimated for the image plane of the camera 125 at consecutive or successive times based on each of the consecutively or successively captured images.

The systems and methods of the present disclosure are directed to realistically animating synthetic objects, e.g., aerial vehicles or other airborne objects, into images (e.g., background images) captured by cameras provided aboard other aerial vehicles having known intrinsic parameters. A trajectory of motion of a synthetic object, which may be a simulated version of an authentic object (e.g., an aerial vehicle, a bird or another airborne object), in three-dimensional space may be identified or selected. A position and an orientation of the camera (e.g., a pose of the camera) in three-dimensional space may be estimated based on data captured using gyroscopes, accelerometers, magnetometers and/or position sensors provided aboard the aerial vehicle, e.g., inertial measurement unit data. For example, the location and attitude of the camera at a time that each image of a sequence is captured, relative to a fixed Earth-bound coordinate frame, may be determined based on inertial measurement unit data captured over the duration of the sequence. In some embodiments, images captured by a camera may be tagged or otherwise associated with information, data or metadata regarding position and orientations of the camera, as determined from the inertial measurement unit data, at the times at which such images are captured.

Locations of a synthetic object at various times may be projected into a two-dimensional image plane of the camera at such times, based on positions and orientations of the camera determined subject to the first degree of error or tolerance. The accuracy of a location of a synthetic object projected into an image plane of a camera is limited to the accuracy of the inertial measurement unit components that captured the data from which the pose of the camera was determined. Because levels of accuracy of inertial measurement unit components are limited, however, rendered images of a synthetic object projected into a sequence of images based on inertial measurement unit data may appear to "bounce" or "jump," or otherwise move between consecutive frames in an unnatural or unrealistic manner that is inconsistent with actual motion of an authentic object of the same type.

In accordance with the present disclosure, a pixel-accurate estimation of a camera's motion from image-to-image may be estimated by a homography, which maps locations of pixels in one image to locations of the same pixels in a successively captured image, specifically where the images are calculated at a sufficiently high altitude and at a sufficiently high frame rate. Based on the homography, a location of a synthetic object within an image plane at a given time, or of a rendered image of the synthetic object within an image captured by the camera at the given time, may be adjusted accordingly.

Rendered images of the synthetic object may be generated and overlaid, e.g., "composited," on images captured by the camera in such locations in the image plane of the camera, or in images captured by the camera, and in a manner that best approximates motion of the synthetic object according to the trajectory. The rendered images may be generated based on the trajectory and one or more attributes of the synthetic object, e.g., sizes, shapes, colors, or other attributes. Upon blending the rendered images with the images captured by the camera, a photorealistic view of the synthetic object within the images captured by the camera may appear as if the synthetic object was authentically present within the field of view when the images were captured.

The trajectory of the synthetic object may be selected with respect to a trajectory of the aerial vehicle, and the camera that captured the images. For example, a trajectory of a synthetic object within an image plane of a camera provided aboard an aerial vehicle may be selected to cause the synthetic object to appear to cross the trajectory of the aerial vehicle, to approach the aerial vehicle, or to travel in any other manner with respect to the aerial vehicle. Motion of a synthetic object represented in a trajectory may have two components, e.g., a radial component, subject to which the synthetic object appears to travel toward or away from the camera, such as by increasing or decreasing in size, and a transverse component, subject to which the synthetic object appears to travel across an image plane of the camera.

Background motion in an image captured at a given time may be best estimated, to a pixel-accurate level, by a homography between a preceding image and the image. For example, a homography $H(t_i)$ maps a pixel $x(t_{(i-1)})$ on an image captured at time $t_{(i-1)}$ to a pixel $x(t_i)=H(t_i)\cdot x(t_{(i-1)})$ of an image captured at time $t_i$. Where $X(t_{(i-1)})$ and $X(t_i)$ are locations of an identical pixel of the synthetic object (e.g., an identical point) in the images captured at time $t_i$ and time $t_{(i-1)}$, or a plurality of pixels of the synthetic object, where $P(t_i)=K\cdot[R(t_i)|T(t_i)]$ is the camera projection matrix at time $t_i$, where K is the matrix of the calibrated intrinsic parameters of the camera, e.g., according to a pinhole model representation of the camera, where $R(t_i)$ and $T(t_i)$ are the camera rotation matrix and the translation vector with respect to an Earth-fixed coordinate frame, determined based on inertial measurement unit data captured at that time, a discrete-time approximation of instantaneous velocity of the image of the object point on an image plane at time $t_i$ is a vector difference between projections of the object into consecutive images, or $$v(t_i)=P(t_i)\cdot X(t_i)-P(t_i)\cdot X(t_{(i-1)})$$

In some embodiments, the pixel or pixels of the synthetic object may correspond to a common point on a surface of the synthetic object, a center of mass of the synthetic object, or any other portion of the synthetic object. A pixel-accurate location $X_r(t_i)$ of the pixel of the synthetic object in an image captured at time $t_i$ may be estimated or otherwise determined with respect to the background based on the homography and the velocity, or $$X_r(t_i)=H(t_i)\cdot(X(t_{(i-1)})+v(t_i))$$

Therefore, an adjustment term (or adjustment factor, or adjustment vector) $n(t_i)$ transforming a location $X(t_i)$ of the pixel of the synthetic object within an image captured at time $t_i$ determined from inertial measurement unit data to the pixel accurate location is $$n(t_i)=X_r(t_i)-X(t_i)$$

The adjustment term $n(t_i)$ may be calculated for each rendered image and used to adjust their locations within the image planes at each time $t_i$. In some embodiments, each rendered image may be warped, e.g., by an affine transformation, based on the adjustment term. After the locations have been adjusted accordingly, the rendered images may be blended with images captured by the camera at each time $t_i$. The blended images and the adjusted locations of the rendered images (e.g., specific points or pixels corresponding to the synthetic objects) may then be used, e.g., as training inputs and training outputs, to train any type or form of machine learning algorithm to detect the synthetic object within imaging data. For example, the blended images may be provided to a machine learning algorithm as training inputs, and outputs received from the machine learning algorithm may be compared to training outputs in the form of the adjusted locations of the rendered images within the image planes, e.g., in a supervised manner. The machine learning algorithm may be adjusted based on differences between the training outputs and the outputs received from the machine learning algorithm, and ultimately programmed into one or more operational aerial vehicles for use in detecting, identifying or classifying airborne objects. Alternatively, the blended images may be provided to a machine learning algorithm as training inputs, e.g., in an unsupervised manner.

Figure 2:
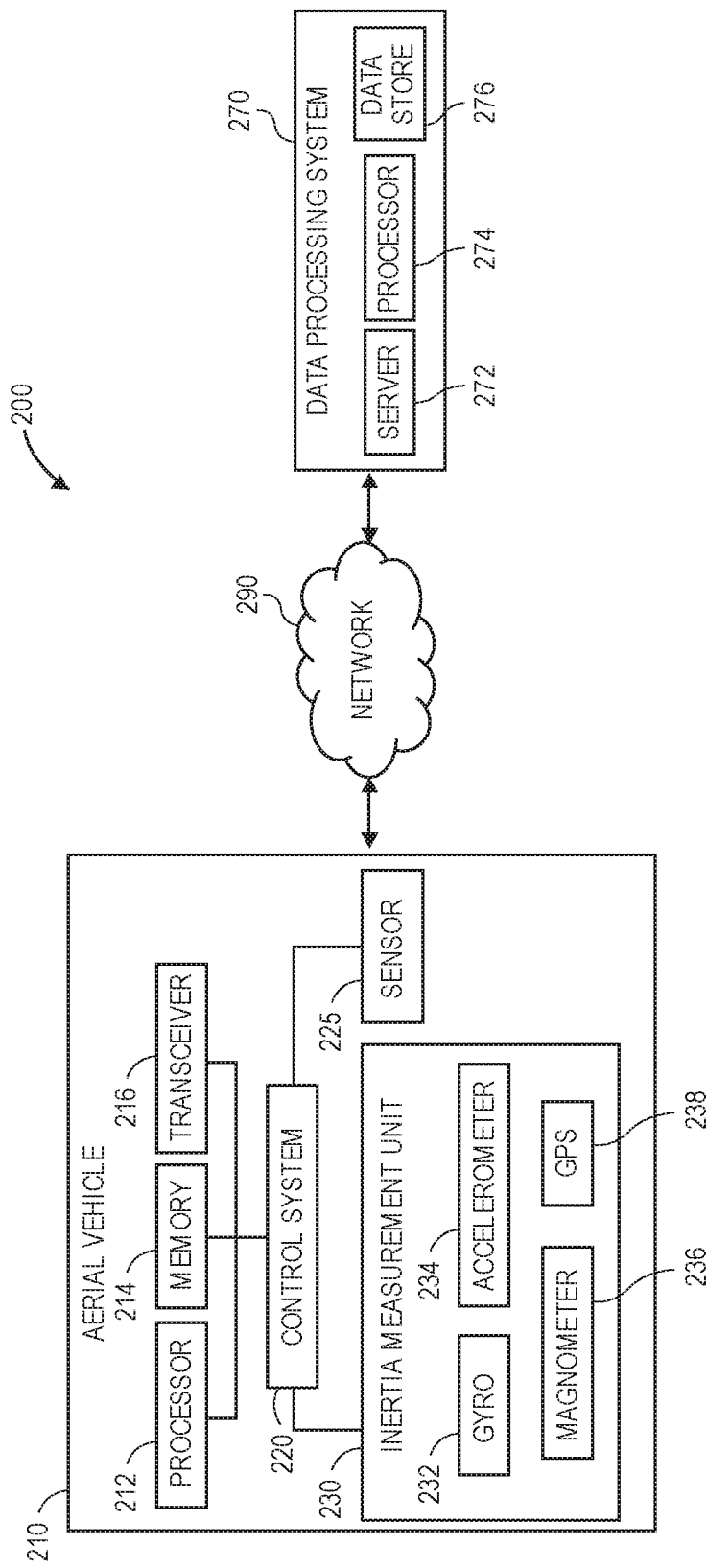
FIG. 2 is a block diagram of one system for generating training data in accordance with embodiments of the present disclosure.

Referring to FIG. 2, a block diagram of one system 200 for generating training data in accordance with embodiments of the present disclosure is shown. The system 200 of FIG. 2 includes an aerial vehicle 210 and a data processing system 270 that are connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1H.

The aerial vehicle 210 includes a processor 212, a memory 214 and a transceiver 216, as well as a control system 220, an inertial measurement unit 230, and one or more sensors 225. Additionally, the aerial vehicle 210 may include any number of other components, including but not limited to airframes, propulsion motors, propellers, control surfaces, item engagement systems, landing gear components, lighting systems, or others.

The processors 212 may be configured to perform any type or form of computing function. For example, the processors 212 may control any aspects of the operation of the aerial vehicle 210 and any components thereon, including but not limited to propulsion motors, propellers, control surfaces, item engagement systems, landing gear components, lighting systems, imaging devices or other operational or environmental sensors. For example, the processors 212 may control the operation of one or more control systems or modules, such as the control system 220, for generating instructions for conducting operations of the aerial vehicle 210, including but not limited to instructions for causing propulsion motors to operate at a predetermined or selected speed, for causing propellers to rotate at a predetermined or selected pitch or configuration, or for causing one or more sensors to capture information or data of any type or form. The processors 212 may further control the operation of the one or more sensors 225 to capture data of any type or form during the operation of the aerial vehicle 210. Similarly, the processors 212 may control the operation of one or more control surfaces (not shown), including but not limited to wings, rudders, ailerons, elevators, flaps, brakes, slats or other features. The processors 212 may communicate with the data processing system 270 or one or more other computer devices (not shown) over the network 290, through the sending and receiving of digital data.

The processors 212 may be a uniprocessor system including one processor, or a multiprocessor system including several processors (e.g., two, four, eight, or another suitable number), and may be capable of executing instructions. For example, in some embodiments, the processors 212 may be a general-purpose or embedded processor implementing any of a number of instruction set architectures (ISAs), such as the x86, PowerPC, SPARC, or MIPS ISAs, or any other suitable ISA. Where one or more of the processors 212 is a part of a multiprocessor system, each of the processors within the multiprocessor system may implement the same ISA, or different ISAs.

Additionally, the memory or storage components 214 (such as databases or data stores) are configured for storing any type of information or data, e.g., instructions for operating the aerial vehicle 210, or information or data captured during operations of the aerial vehicle 210, e.g., by any of the sensors 225 or the inertial measurement unit 230. The memory components 214 may be configured to store executable instructions, flight paths, flight control parameters and/or other data items accessible by or to the processors 212. The memory components 214 may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other data items may be received or sent via the transceivers 216, e.g., by transmission media or signals, such as electrical, electromagnetic, or digital signals, which may be conveyed via a communication medium such as a wired and/or a wireless link.

The transceivers 216 may be configured to enable the aerial vehicle 210 to communicate using one or more wired or wireless systems or components, e.g., wired technologies such as Universal Serial Bus (or "USB") or fiber optic cable, or standard wireless protocols, such as over the network 290 or directly. In some embodiments, the transceivers 216 may be configured to transmit and receive electromagnetic signals, such as one or more radiofrequency signals, and may include one or more components configured to transmit such signals according to Bluetooth® or any Wireless Fidelity (or "Wi-Fi") protocol. In some embodiments, the transceivers 216 may be configured to transmit and receive light signals, and may include one or more light emitting diode (or "LED") transmitters and/or one or more optical sensors or receivers. In still other embodiments, the transceivers 216 may be configured to transmit and receive acoustic signals, and may include one or more devices having transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters, as well as one or more microphones, piezoelectric sensors, vibration sensors or other acoustic sensors. Such signals may be open and unencrypted, and captured and interpreted by any vehicle, station or object within a signal range of the transceivers 216, or subject to any form or level of encryption.

The transceivers 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems via the network 290, e.g., the data processing system 270, or others. For example, in some embodiments, the transceivers 216 may be configured to coordinate I/O traffic between the processors 212 and one or more onboard or external computer devices or components. The transceivers 216 may perform any necessary protocol, timing or other data transformations in order to convert data signals from a first format suitable for use by one component into a second format suitable for use by another component. In some embodiments, the transceivers 216 may include support for devices attached through various types of peripheral buses, e.g., variants of the Peripheral Component Interconnect (PCI) bus standard or the Universal Serial Bus (USB) standard. In some other embodiments, functions of the transceivers 216 may be split into two or more separate components, or integrated with the processors 212. Although the transceivers 216 are shown as single components for transmitting and/or receiving information or data, those of ordinary skill in the pertinent arts will recognize that the aerial vehicle 210 may include any number of transceivers, or, alternatively or additionally, any number of transmitting and/or receiving devices that may be provided as discrete components.

The control system 220 may include one or more electronic speed controls, power supplies, navigation systems and/or payload engagement controllers for controlling the operation of the aerial vehicle 210 and for engaging with or releasing items (not shown), as desired. For example, the control system 220 may be configured to cause or control the operation of one or more of propulsion motors, propellers, sensors or other aspects of the aerial vehicle 210, such as to cause one or more of propulsion motors to rotate propellers at a desired speed, in order to guide the aerial vehicle 210 along a determined or desired flight path, or to perform any other function. The control system 220 may also be configured to cause or control the operation of the one or more sensors, which may include but are not limited to imaging devices, acoustic sensors, light sensors, or any other type or form of environmental and/or operational sensors (not shown). The control system 220 may further control other aspects of the aerial vehicle 210, including but not limited to the operation of one or more control surfaces (not shown) such as wings, rudders, ailerons, elevators, flaps, brakes, slats or other features within desired operating ranges, or the enactment with or release of one or more items by one or more engagement systems (not shown). In some embodiments, the control system 220 may be integrated with one or more of the processors 212, the memory components 214 and/or the transceivers 216.

As is discussed above, in some embodiments, the aerial vehicle 210 may include one or more propulsion motors (e.g., electric, gasoline-powered or any other motor) joined to an airframe and capable of generating sufficient rotational speeds of corresponding propellers or other components to provide lift and/or thrust forces to the aerial vehicle 210 and any payload engaged thereby, such as to aerially transport the engaged payload from one location to another. For example, one or more of such propulsion motors may be a brushless direct current (DC) motor such as an outrunner brushless motor or an inrunner brushless motor. Additionally, the propulsion motors of the aerial vehicle 210 may be of any kind, and may be dedicated to one or more purposes or functions. For example, one or more of the propulsion motors may be aligned or configured to provide forces of lift to the aerial vehicle 210, exclusively, while one or more of the propulsion motors may be aligned or configured to provide forces of thrust to the aerial vehicle 210, exclusively. Alternatively, one or more of the propulsion motors may be aligned or configured to provide forces of lift and/or forces of thrust to the aerial vehicle 210, as needed. For example, such propulsion motors may be fixed in their orientation on the aerial vehicle 210, or configured to vary their respective orientations, e.g., a tilt-rotor aircraft. Moreover, such propulsion motors may be aligned or configured to operate with different capacities or ratings, or at different speeds, or coupled to propellers having different sizes and shapes. Such propulsion motors may be controlled by the processors 212, the control system 220, or any other aspect of the aerial vehicle 210.

Additionally, the propulsion motors of the aerial vehicle 210 may be coupled to one or more propellers, e.g., any rotors or rotatable systems having a plurality of shaped blades joined to a hub or boss. Each of such propellers may be rotatably mounted to a mast or shaft associated with a corresponding one of the propulsion motors and configured to generate forces of thrust when rotated within a fluid. Each of such propellers may also include any number of blades, and may be fixed pitch, adjustable pitch or variable pitch in nature. Moreover, one or more of the propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly. Such propellers may be controlled by the processors 212, the control system 220, or any other aspect of the aerial vehicle 210.

The sensors 225 may be any devices, systems or components that are configured to capture data regarding the aerial vehicle 210, or its surroundings, as the aerial vehicle 210 is engaged in operations or testing, or at any other time. In some embodiments, the sensors 225 may include any number of sensors, e.g., a suite of such sensors, of any type or form. For example, the sensors 225 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the aerial vehicle 210, for any purpose. For example, the sensors 225 may be configured to capture or detect reflected light if the reflected light is within a field of view of the sensors 225, which is defined as a function of a distance between an imaging sensor and a lens within the sensors 225, viz., a focal length, as well as a position of the sensors 225 and an angular orientation of the lens. Accordingly, where an object appears within a depth of field, or a distance within the field of view where the clarity and focus is sufficiently sharp, the sensors 225 may capture light that is reflected off objects of any kind to a sufficiently high degree of resolution using one or more sensors thereof, and store information regarding the reflected light in one or more data files.

The sensors 225 may also include manual or automatic features for modifying a field of view or orientation. For example, the sensors 225 may be a digital camera configured in a fixed position, or with a fixed focal length (e.g., fixed-focus lenses) or angular orientation. Alternatively, the sensors 225 may include one or more actuated or motorized features for adjusting a position of the sensors 225, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensors 225, or a change in one or more of the angles defining the angular orientation of the sensors 225.

For example, the sensors 225 may be an imaging device that is hard-mounted to the aerial vehicle 210 in a fixed configuration or angle with respect to one, two or three axes. Alternatively, however, the sensors 225 may be provided with one or more motors and/or controllers for manually or automatically operating one or more of the components, or for reorienting the axis or direction of the sensors 225, i.e., by panning or tilting the sensors 225. Panning the sensors 225 may cause a rotation within a horizontal plane or about a vertical axis (e.g., a yaw), while tilting the sensors 225 may cause a rotation within a vertical plane or about a horizontal axis (e.g., a pitch). Additionally, the sensors 225 may be rolled, or rotated about its axis of rotation, and within a plane that is perpendicular to the axis of rotation and substantially parallel to a field of view of the sensors 225.

Imaging data (e.g., still or moving images, as well as associated audio data or metadata) captured using the sensors 225 may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensors 225 may further be or include one or more sound sensors (e.g., microphones, piezoelectric sensors, vibration sensors or other transducers for detecting and recording acoustic energy from one or more directions), speedometers, inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

The sensors 225 may be further configured to capture, record and/or analyze information or data regarding the aerial vehicle 210, and to analyze such data or information by one or more means, e.g., by aggregating or summing such information or data to form one or more qualitative or quantitative metrics associated with the motion of the aerial vehicle 210. For example, a net vector indicative of any and all relevant movements of the aerial vehicle 210, including but not limited to physical accelerations, velocities, positions or orientations of the sensors 225, may be derived, and the net vector may include any other values associated with information or data captured by any of the sensors 225, e.g., images, sounds, or the like. Additionally, coefficients or scalars indicative of the relative movements of the aerial vehicle 210 may also be defined.

The inertial measurement unit 230 may be any type or form of onboard device for sensing changes in linear or rotational motion of the aerial vehicle 210. As is shown in FIG. 2, the inertial measurement 230 includes one or more gyroscopes 232, one or more accelerometers 234, one or more magnetometers (e.g., compasses) 236, and a Global Positioning System ("GPS") transceiver 238. In some embodiments, the inertial measurement unit 230 may be installed onboard the aerial vehicle 210, such as at or near a center of gravity of the aerial vehicle 210, or in another position aboard the aerial vehicle 210, and intended for use during in-flight operations, e.g., in association with an inertial navigation system. In some other embodiments, however, the inertial measurement unit 230 may be strapped or mounted to the aerial vehicle 210.

The gyroscopes 232 may be any mechanical or electrical devices, components, systems, or instruments for determining an orientation, e.g., the orientation of the aerial vehicle 210. For example, the gyroscope 232 may be a traditional mechanical gyroscope having at least a pair of gimbals and a flywheel or rotor. Alternatively, the gyroscope 232 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 210. In some embodiments, the gyroscopes 232 may generate angular rate data in any direction or along or about any axis. The accelerometers 234 may be any mechanical or electrical devices, components, systems, or instruments for sensing or measuring accelerations, including but not limited to devices having one or more potentiometers, linear variable differential transformers, variable reluctance devices or piezoelectric components. For example, in some embodiments, the accelerometers 234 may be configured to capture acceleration data in any direction or along or about any axis, e.g., a triaxial accelerometer. The gyroscopes 232 and/or the accelerometers 234 may be configured to generate angular rate data or acceleration data, respectively, at any rate or frequency, such as at frequencies ranging from zero to five hundred Hertz (0-500 Hz) or at frequencies greater than five hundred hertz (500 Hz). In some embodiments, the accelerometers 234 may be gravimeters or other components configured to determine accelerations due to gravity.

The magnetometers 236 may be any devices, components, systems, or instruments adapted to capture information or data regarding a magnetic field of the Earth, or to otherwise determine one or more directions with respect to a frame of reference that is fixed with respect to the surface of the Earth (e.g., a pole thereof). For example, the magnetometers 236 may include one or more components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). The GPS transceiver 238 may be any device, component, system or instrument adapted to receive signals (e.g., trilateration data or information) relating to a position of the inertial measurement unit 230 from one or more GPS satellites of a GPS network (not shown), or for reporting the position of the inertial measurement unit 230 determined based on such signals. Alternatively, the GPS transceiver 238 may be any device or component for determining geolocations (e.g., geospatially-referenced points that precisely define an exact location in space with one or more geocodes), such as a set of geographic coordinates, e.g., a latitude and a longitude, and, optionally, an elevation that may be ascertained from signals (e.g., trilateration data or information) or geographic information system (or "GIS") data. Geolocations of the GPS transceiver 238 or the inertial measurement unit 230 may be associated with the aerial vehicle 210, where appropriate.

In some embodiments, the inertial measurement unit 230 may further include any number of computer components, e.g., one or more processors, memory components and/or transceivers (not shown), or any other components for aiding in the determination of accelerations, velocities, positions and/or orientations.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing information regarding periods of oscillation, vectors of axes of rotation, moments of inertia, or other information or data received from the aerial vehicle 210 or, alternatively, provided in connection with one or more other physical or virtual services configured to receive, analyze or store such information or data, as well as one or more other functions. The servers 272 may be connected to or otherwise communicate with the processors 274 and the data stores 276, which may store any type of information or data, for any purpose. The servers 272 and/or the computer processors 274 may also connect to or otherwise communicate with the network 290, through the sending and receiving of digital data. For example, the data processing system 270 may include any facilities, stations or locations having the ability or capacity to receive and store information or data, such as media files, in one or more data stores, e.g., acoustic signals or energy, or related information or data received from the aerial vehicle 210, or from one or more other external computer systems (not shown) via the network 290. In some embodiments, the data processing system 270 may be provided in a physical location. In other such embodiments, the data processing system 270 may be provided in one or more alternate or virtual locations, e.g., in a "cloud"-based environment. In still other embodiments, one or more components of the data processing system 270 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 212, the control system 220 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, some embodiments of the present disclosure may be utilized to generate training data for use in training machine learning algorithms, systems or techniques to detect objects (such as aerial vehicles) within imaging data by capturing background images using a camera provided aboard an aerial vehicle and inserting synthetic objects (e.g., images of other aerial vehicles) into the background images. The synthetic objects are inserted into the background images at locations determined based on desired trajectories of the synthetic objects, and poses of the camera as determined from data captured by an inertial measurement unit provided on the aerial vehicle and a homography estimated for image planes based on pixels appearing in successively captured background images.

Figure 3A:
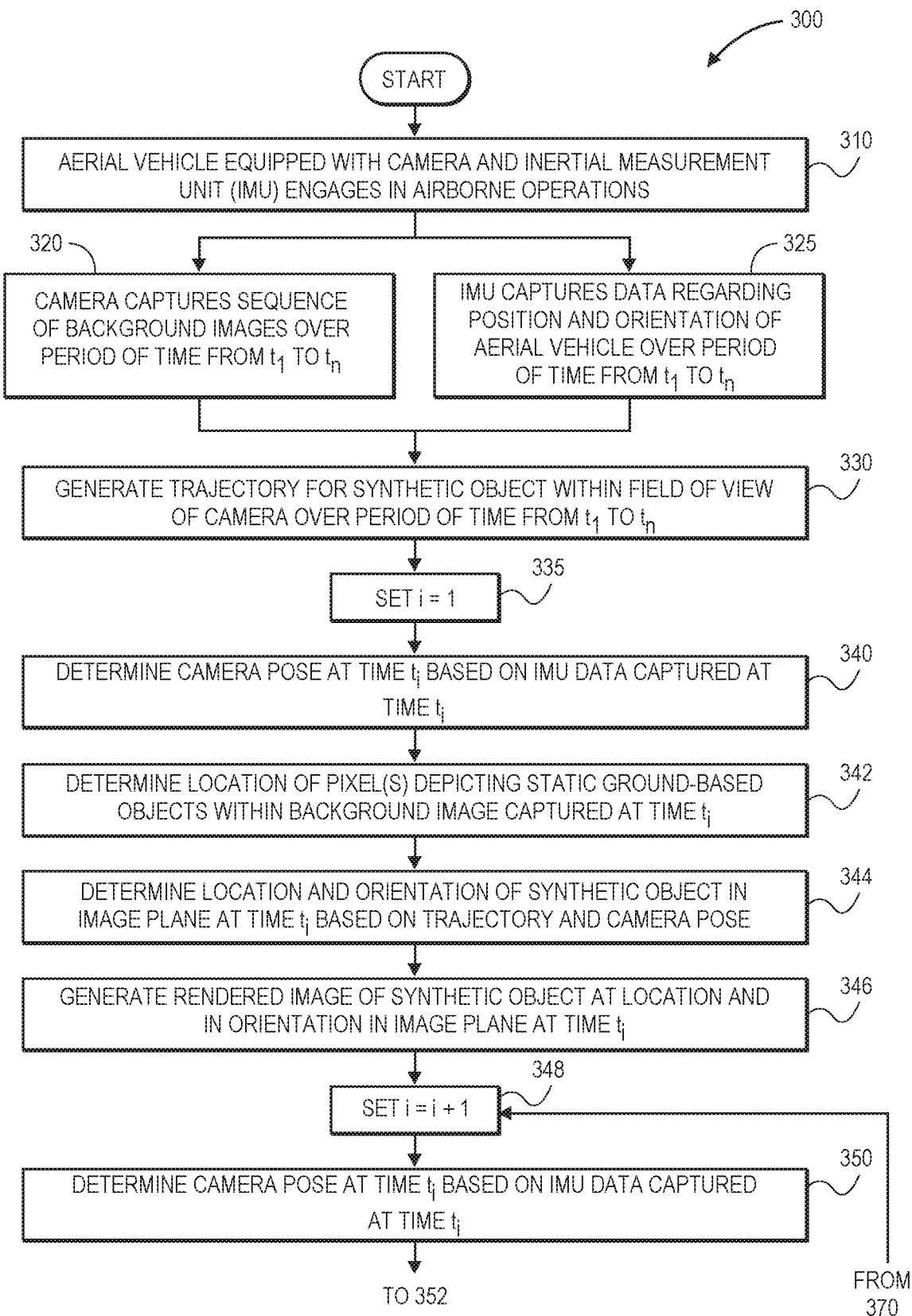
FIGS. 3A, 3B and 3C are a flow chart of one method for generating training data in accordance with embodiments of the present disclosure.
Figure 3B:
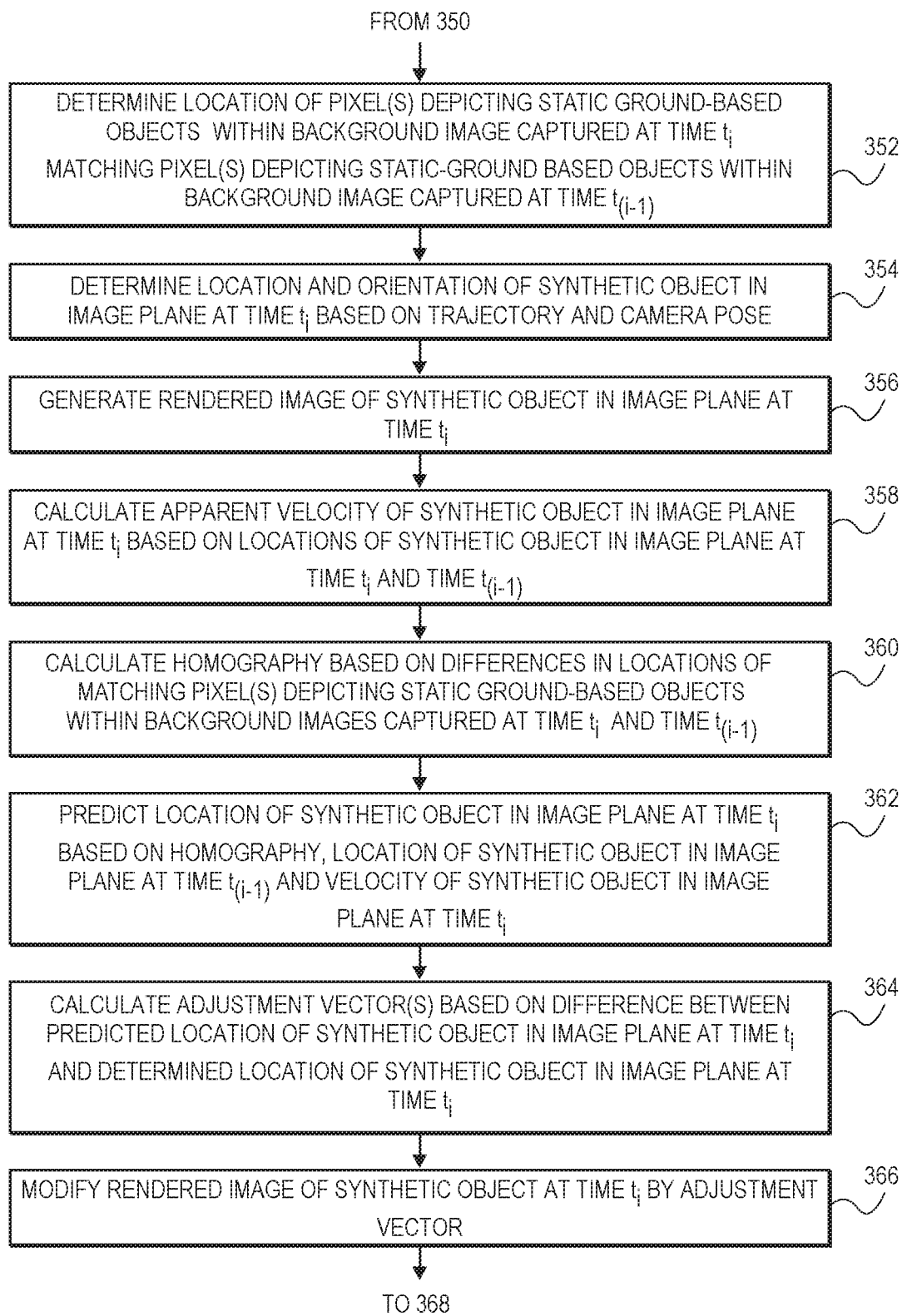
Figure 3C:
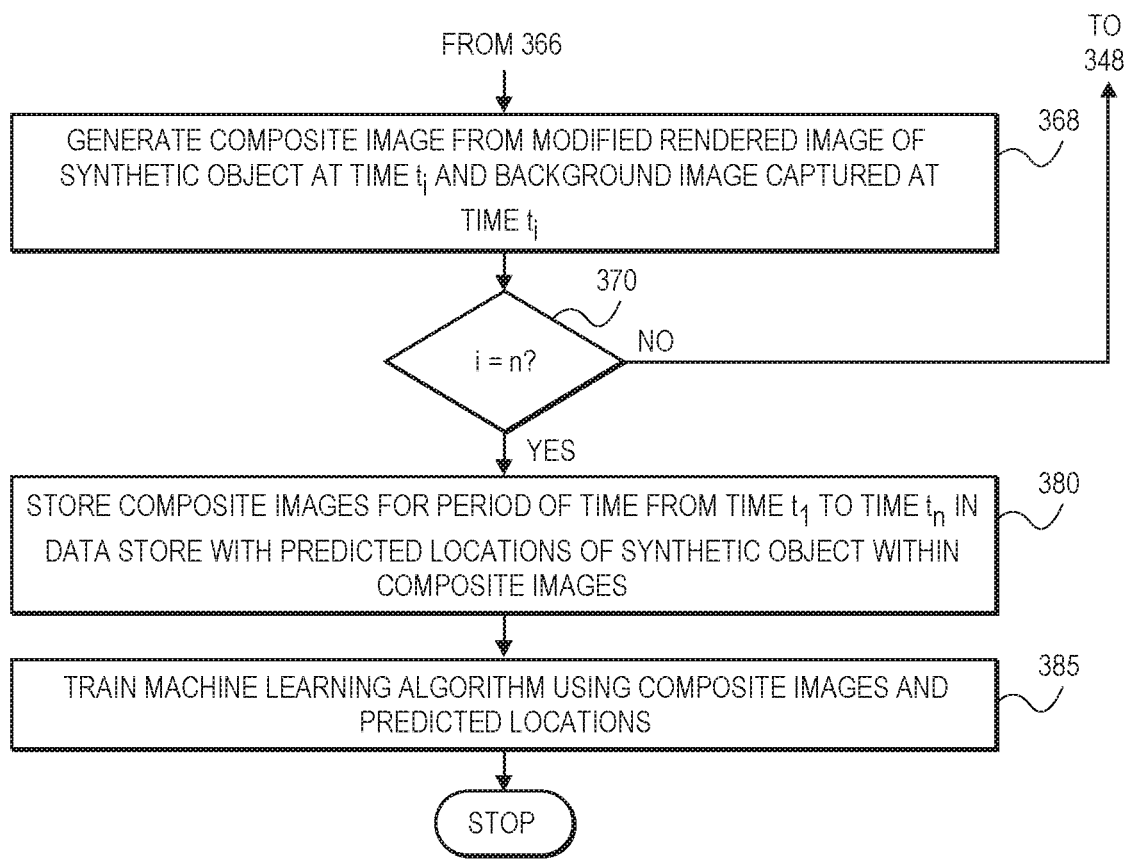

Referring to FIGS. 3A through 3C, a flow chart 300 of one method for generating training data in accordance with embodiments of the present disclosure is shown. At box 310, an aerial vehicle equipped with a camera and an inertial measurement unit engages in airborne operations. The aerial vehicle may be a UAV, or a drone, or any other type of aerial vehicle, and the airborne operations may involve one or more flights for any purpose. For example, the airborne operations may be specifically limited to capturing imaging data or, alternatively, may include one or more other purposes other than capturing imaging data. Additionally, the inertial measurement unit may include sensors such as one or more gyroscopes, accelerometers, magnetometers and/or position sensors.

At box 320, the aerial vehicle captures a sequence of background images over a period of time from time $t_i$ to time $t_n$. The camera may be configured to capture images at any frame rate, such as ten, fifteen, twenty, thirty, sixty frames per second (fps) or more, and may include any type or form of background features within a field of view, including but not limited to natural land forms such as hills, valleys or plateaus; artificial land forms such as buildings, towers, bridges or structures; water bodies such as oceans, lakes, ponds or rivers; plant life such as trees, grasses, or flowers; or airborne or celestial objects such as clouds, planets, moons or stars. The period of time may be of any duration, including but not limited to any number of seconds, minutes, hours or other units. In some embodiments, the frame rate at which the sequence of images is captured is sufficiently high, such that overall camera translation is sufficiently small with respect to a distance from the camera to visible aspects of the scene, e.g., one or more background features.

In parallel, at box 325, the inertial measurement unit captures data regarding a position and an orientation of the aerial vehicle over the period of time from time $t_i$ to time $t_n$. The inertial measurement unit data may be captured by one or more gyroscopes, accelerometers, magnetometers (e.g., compasses) and/or position sensors, and may include acceleration data or velocity data regarding the motion of the aerial vehicle, or other data regarding positions or orientations of the aerial vehicle, at any frequency, such as 0 to 500 Hz, or greater. The data captured by the inertial measurement unit may represent accelerations or angular velocities of the inertial measurement along or about any axis, as well as positions in three-dimensional space, or angular orientations about any axis, e.g., yaw, pitch and roll axes of the aerial vehicle, or any other axes. The data captured by the inertial measurement unit or other sensors may be stamped, marked or otherwise associated with respective positions of the aerial vehicle when the data was captured, or times at which the data was captured.

At box 330, a trajectory for a synthetic object within a field of view of the camera over the period of time from time $t_i$ to time $t_n$ is generated. For example, with respect to the motion of the aerial vehicle during the airborne operations in which the aerial vehicle was engaged during the period of time from time $t_i$ to time $t_n$, a trajectory of an object that passes through the field of view of the camera for at least a portion of the period of time from time $t_i$ to time $t_n$, e.g., a set of points in three-dimensional space and times at which the object is located at such points, may be selected. In some embodiments, the synthetic object may be a synthetic representation of an aerial vehicle or other airborne object, such as a bird, and the trajectory may be a path in three-dimensional space on which an authentic version of the synthetic object might travel. In some embodiments, the trajectory may be generated based on actual attributes of the authentic version of the synthetic objects. For example, where the synthetic object is an aerial vehicle of a specific type or class, the trajectory may be defined or constrained by operational characteristics of the aerial vehicle, including but not limited to velocities, accelerations, altitudes, turn radii, climb rates, descent rates, or other values, including average, nominal or maximum levels or ranges of such values.

At box 335, a value of a step variable i is set equal to one, or i=1. At box 340, a camera pose at time $t_i$ is determined based on the inertial measurement unit data captured at time $t_i$. For example, where the camera is in a fixed configuration or has an axis or orientation that is fixed with respect to one, two or three principal axes of the aerial vehicle, the pose of the camera at the time $t_i$ may be readily determined based on the inertial measurement unit data captured at the time $t_i$, which may describe a position and an orientation of the aerial vehicle, or any other attributes of the aerial vehicle.

At box 342, a location of a pixel (or locations of a set of pixels) depicting static or ground-based objects within a background image captured at time t is determined. For example, the pixel, or the set of pixels, may depict or correspond to one or more background features, e.g., natural or artificial land forms, water bodies, plant life, or airborne or celestial objects, and the two-dimensional coordinates or other identifiers of locations of such pixels within an image plane at time $t_i$ may be determined.

At box 344, a location and an orientation of the synthetic object in an image plane of the camera at time $t_i$ are determined based on the trajectory determined at box 330 and the camera pose determined at box 340. Where the trajectory of the synthetic object is determined in three-dimensional space, and the intrinsic parameters of the camera are known, the three-dimensional position of the synthetic object at time $t_i$, as determined from the trajectory may be projected into the image plane using a camera matrix or in any other manner, and the two-dimensional coordinates or other identifiers of locations of one or more pixels (e.g., pixels at or corresponding to a centroid of the synthetic object) may be determined.

At box 346, a rendered image of the synthetic object at the location and in the orientation in the image plane at time t determined at box 344 is generated. For example, based on the location and orientation of the synthetic object determined at box 344, and one or more physical attributes of the synthetic object, e.g., sizes, shapes, colors or other attributes, a photorealistic view or image of the synthetic object at the location and the orientation at time $t_i$ may be determined.

At box 348, a value of the step variable i is incremented by one, e.g., set to equal i+1, or i=i+1. At box 350, a camera pose at time $t_i$ is determined based on the inertial measurement unit data captured at time $t_i$. For example, as is discussed above, the pose may be determined based on the inertial measurement unit data captured at the time $t_i$, which may describe a position, an orientation or any other attributes of the aerial vehicle at the time $t_i$.

At box 352, a location of the pixel (or locations of the set of pixels) depicting the static ground-based objects or features within a background image captured at time $t_i$ that match the pixel or pixels depicting static or ground-based objects or features within a background image captured at time $t_{(i-1)}$ is determined. For example, the pixel (or the set of pixels) depicting or corresponding to static, ground-based background features at box 342 may be identified within a next background image captured at time $t_i$, e.g., by one or more pixel matching techniques, and the location of the pixel or pixels within the background image captured at time $t_i$ may be determined.

At box 354, a location and an orientation of the synthetic object in an image plane of the camera at time $t_i$ are determined based on the trajectory determined at box 330 and the camera pose determined at box 350. For example, as is discussed above, the three-dimensional position of the synthetic object at time $t_i$, as determined from the trajectory, e.g., by advancing the synthetic object from its position at time $t_{(i-1)}$, may be projected into the image plane using a camera matrix or in any other manner, and the two-dimensional coordinates or other identifiers of locations of one or more pixels (e.g., pixels at or corresponding to a centroid of the synthetic object) within the image plane at time $t_i$ may be determined.

At box 356, a rendered image of the synthetic object at the location and in the orientation in the image plane at time $t_i$ determined at box 354 is generated. For example, as is discussed above, where the location and the orientation of the synthetic object at time $t_i$ have been determined, and where physical attributes of the synthetic object are known, the rendered image may be generated to reflect the location and the orientation of the synthetic object at time $t_i$, e.g., the appearance of the synthetic object within the field of view of the camera.

In some embodiments, a rendered image generated based on a location and an orientation of the synthetic object at a previous time may be modified to generate the rendered image at box 356. For example, the trajectory of the synthetic object generated at box 330 may be represented as a sum of both radial motion, e.g., motion toward or away from the camera, and also transverse motion, e.g., motion across the field of view of the camera. Where the trajectory involves radial motion, a size of a previously generated rendered image may be increased or decreased within the image plane, to represent radial motion of the object toward or away from the camera. Where the trajectory involves transverse motion, a previously generated rendered image may be moved to a different location within an image plane of the camera. To the extent that an orientation of the synthetic object varies based on the trajectory, a previously generated rendered image may also be modified accordingly.

At box 358, an apparent velocity of the synthetic object in the image plane at time $t_i$ is determined based on the locations of the synthetic object in the image plane at time $t_i$ and time $t_{(i-1)}$. For example, an apparent velocity within the two-dimensional image plane of the camera may be determined as a difference between projections of the position of the synthetic object into the image plane at consecutive times.

At box 360, a homography is calculated based on differences between the locations of the matching pixel (or the set of pixels) depicting the static ground-based objects in the images captured at time $t_1$ and time $t_{(i-1)}$. In some embodiments, the homography between the image plane at time $t_i$ and the image plane at plane at time $t_{(i-1)}$, is estimated based on pixels depicting the static ground-based objects in consecutive images captured at time $t_1$ and time $t_{(i-1)}$, subject to the change in the position and orientation of the camera between the times.

At box 362, a predicted location of the synthetic object in the image plane at time $t_1$ is determined based on the homography calculated at box 360, the location of the synthetic object in the image plane at time $t_{(i-1)}$ and the velocity of the synthetic object in the image plane at time $t_i$. For example, the predicted location within the image plane of a position of the synthetic object in three-dimensional space, as determined from the trajectory, is identified based on observed differences in the pose of the camera represented in the homography calculated at box 360. Because the homography approximates the apparent instantaneous motion of background features within consecutive images, which is sufficiently small compared to the overall motion of the camera, the homography indicates pixel-accurate differences in camera pose between the consecutive images that are more accurate than differences in camera pose determined from inertial measurement unit data alone.

At box 364, one or more adjustment vectors (or adjustment terms, or adjustment factors) are calculated based on differences between the predicted locations of the synthetic object in the image plane at time $t_i$ determined at box 362, e.g., based on the homography, and the location of the synthetic object in the image plane at time $t_i$ determined at box 354, e.g., based on inertial measurement unit data.

At box 366, the rendered image of the synthetic object at time $t_i$ generated at box 356 is modified by the adjustment vector calculated at box 364, e.g., by repositioning the rendered image within the image plane.

At box 368, a composite image is generated from the rendered image of the synthetic object at time $t_i$, as modified at box 366, and the background image captured at time $t_i$. The composite image may be generated by compositing the modified rendered image into the background image, in a photorealistic manner, such as by alpha-blending the modified rendered image into the background image.

At box 370, whether a value of the step variable i is equal to n, or whether i=n, is determined. If the value of the step variable i is not equal to n, or if i≠n, then the process returns to box 348, where the value of the step variable i is incremented by one, e.g., set to equal i+1, or i=i+1, and to box 350, where a camera pose at time $t_i$ is determined based on the inertial measurement unit data captured at time $t_i$.

If the value of the step variable i is equal to n, or if i=n, then the process advances to box 380, where the composite images generated at box 368 for the period of time from time $t_1$ to time $t_n$ are stored in association with the predicted locations of the synthetic object in the image plane determined for period of time from time $t_1$ to time $t_n$ at box 362, in one or more data stores. At box 385, the composite images and the predicted locations are used to train a machine learning algorithm, e.g., as training inputs and training outputs, and the process ends. For example, the composite images may be provided to the machine learning algorithm as training inputs, and outputs received from the machine learning algorithm, which may indicate whether a composite image depicts a synthetic object (e.g., an aerial vehicle), a location of the synthetic object, or a classification (or identity) of the synthetic object, may be compared to the predicted locations of the synthetic object, to determine whether the machine learning algorithm accurately detected the synthetic object within the composite image. Alternatively, or additionally, training outputs may include not only annotations of a location of the synthetic object but also a classification of the synthetic object, such as a general classification of the synthetic object (e.g., as an aerial vehicle, a bird, or another object), or a specific classification of a type of the synthetic object (e.g., a type or class of aerial vehicle, a species of bird, or the like). In some embodiments, the machine learning algorithm may be trained in an unsupervised manner, e.g., using the composite images alone, and without training outputs.

Images of a synthetic object may be rendered in any manner based on a position and orientation of a camera at a time at which a background image into which the rendered image is to be blended was captured, as well as a position and orientation of the synthetic object in three-dimensional space at the time, as determined from a desired or intended trajectory of the synthetic object. Referring to FIG. 4, a view of aspects of one system for generating training data in accordance with embodiments of the present disclosure is shown. Except where otherwise noted, reference numerals preceded by the number "4" shown in FIG. 4 indicate components or features that are similar to components or features having reference numerals preceded by the number "2" shown in FIG. 2 or by the number "1" shown in FIGS. 1A through 1H.

As is shown in FIG. 4, a synthetic object 480 may be an aerial vehicle (e.g., an airplane) or any other object. In some embodiments, where the synthetic object 480 is consistent with an authentic object, a two-dimensional profile of a rendered image of the synthetic object 480 at a given point on a trajectory may be selected based on the size, shape and dimensions of the authentic object, as well as an intended orientation of the authentic object with respect to a camera. Moreover, where the trajectory of the synthetic object 480 involves radial motion and/or transverse motion, a size of a rendered image of the synthetic object 480 may be increased or decreased accordingly, to account for radial motion of the synthetic object 480 with respect to the camera, and the location of the rendered image of the synthetic object 480 within an image plane may be varied to account for transverse motion of the synthetic object 480 with respect to the camera.

Furthermore, as is noted above, a position and an orientation of a camera aboard an aerial vehicle may be determined based on data captured using an inertial measurement unit provided aboard the aerial vehicle. Positions of a synthetic object along a trajectory in three-dimensional space that are located within a field of view of the camera may be projected into an image plane of the camera, e.g., using a camera matrix. Once an initial location of a synthetic object within an image plane of a camera at a time that an image of a sequence is captured is determined based on inertial measurement unit data, the location may be adjusted to a pixel-accurate level based on a homography estimated for the image plane calculated based on the image and a preceding image in the sequence. The homography may be used to approximate instantaneous motion of a background of the sequence of images, e.g., particularly where the images are captured from a sufficiently high altitude and at a sufficiently high frame rate, such that the overall translation of the camera is small compared to a distance from the camera to a visible scene. Referring to FIGS. 5A through 5E, views of aspects of one system for generating training data in accordance with embodiments of the present disclosure is shown. Except where otherwise noted, reference numerals preceded by the number "5" shown in FIGS. 5A through 5E indicate components or features that are similar to components or features having reference numerals preceded by the number "4" shown in FIG. 4, by the number "2" shown in FIG. 2 or by the number "1" shown in FIGS. 1A through 1H.

Figure 5A:
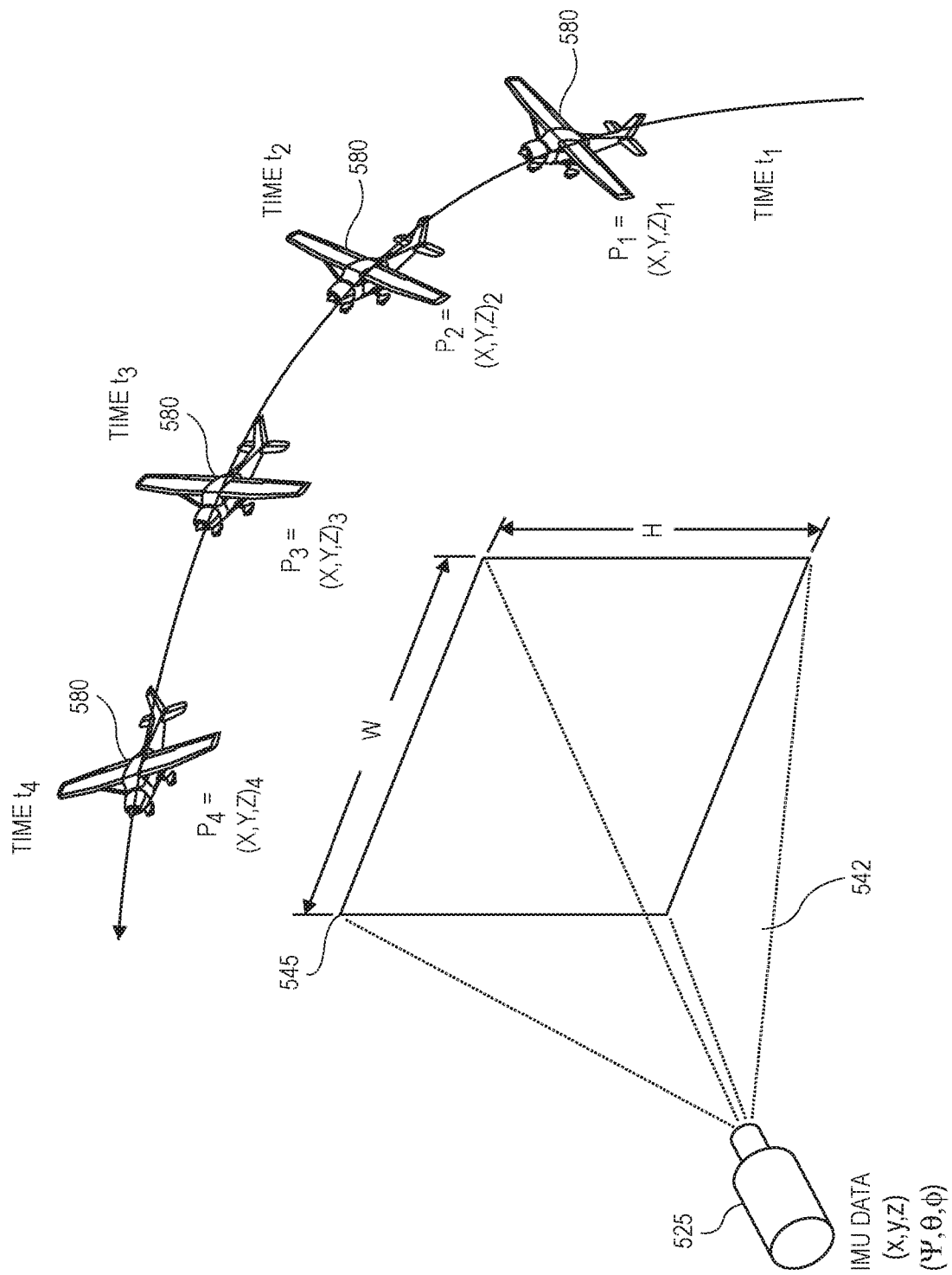

As is shown in FIG. 5A, a camera 525 includes a field of view 542 and an image plane 545 having a width W and a height H. Additionally, a trajectory $T_{580}$ of a synthetic object 580 (e.g., an airplane) passes through the field of view 542 at times $t_1$, $t_2$, $t_3$, $t_4$. In particular, and as is also shown in FIG. 5A, the synthetic object 580 is simulated as being located at a point $P_1=(X, Y, Z)_1$ in three-dimensional space at time $t_1$, at a point $P_2=(X, Y, Z)_2$ in three-dimensional space at time $t_2$, at a point $P_3=(X, Y, Z)_3$ in three-dimensional space at time $t_3$, at a point $P_4=(X, Y, Z)_4$ in three-dimensional space at time $t_4$.

Locations of the synthetic object 580 within image planes of cameras provided aboard aerial vehicles may be determined based on inertial measurement unit data captured by the aerial vehicles. In some embodiments, where an image is captured at a given time by a camera provided aboard an aerial vehicle, the image may be tagged with a position of the camera and an orientation of the camera, e.g., coordinates in three-dimensional space of the camera, such as a latitude, a longitude and an altitude, along with yaw, pitch and/or roll angles of the camera, and stored in one or more data stores. The position and the orientation of the camera may then be used to determine locations of the image plane and the field of view of the camera, which may then be used along with the trajectory $T_{580}$ to determine locations of the synthetic object 580 within the image plane of the camera 525, subject to levels of accuracy or confidence in the inertial measurement unit data.

As is shown in FIG. 5B, where the camera 525 is located at a position $(x, y, z)_i$ and an orientation $(\varphi, \theta, \phi)_i$ at time $t_i$ in three-dimensional space, a location 544-1 of the synthetic object 580 within the image plane 545-1, or $(u, v)_1$, at time $t_i$ may be determined by projecting the point $P_1=(X, Y, Z)_1$ on the trajectory $T_{580}$ into the image plane 545-1, e.g., by a camera matrix.

Figure 5C:
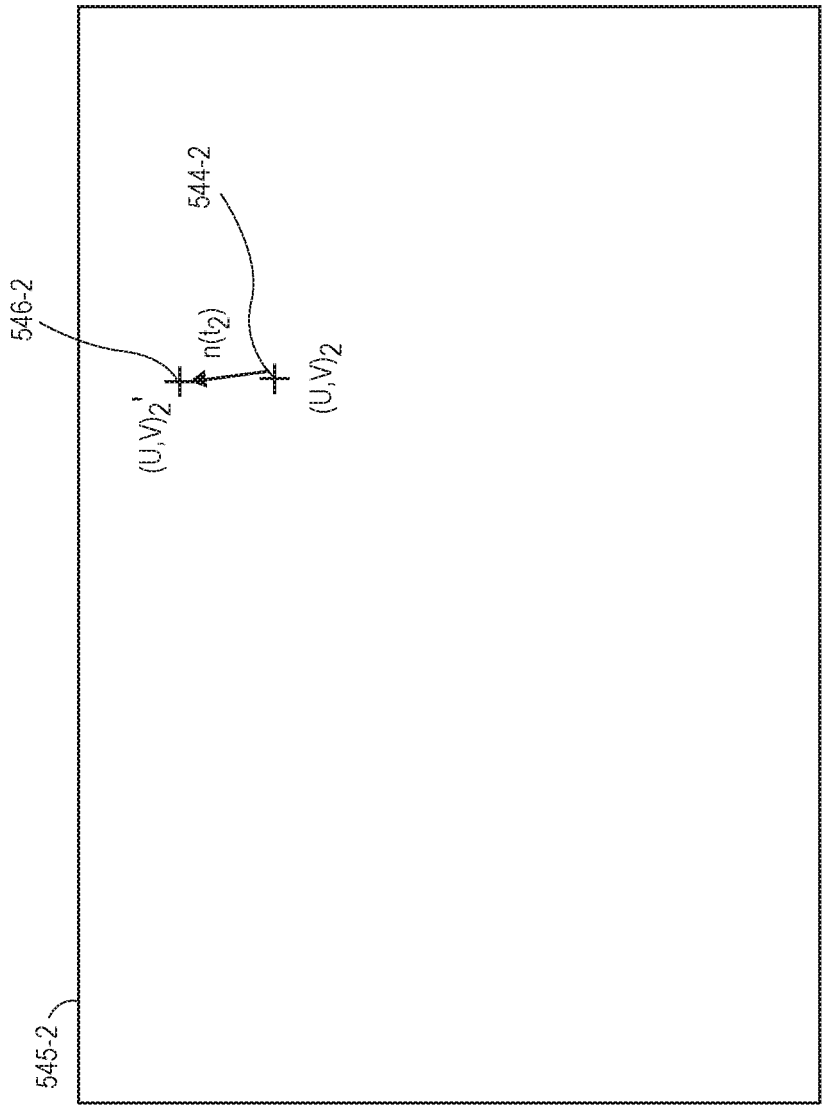

Similarly, as is shown in FIG. 5C, where the camera 525 is located at a position $(x, y, z)_2$ and an orientation $(\varphi, \theta, \phi)_2$ at time $t_2$ in three-dimensional space, a location 544-2 of the synthetic object 580 within the image plane 545-2, or $(u, v)_2$, at time $t_2$ may be determined by projecting the point $P_2=(X, Y, Z)_2$ on the trajectory $T_{580}$ into the image plane 545-2. An adjustment term (or adjustment factor, or adjustment vector) $n(t_2)$ may be determined for the location 544-2 based on a homography estimated for the image plane 545-2 from consecutive images captured at time $t_2$ and time $t_1$. The adjustment term $n(t_2)$ is intended to move the position 544-2 of the synthetic object 580 determined based on inertial measurement unit data to a more realistic location 546-2, or $(u, v)'_2$, within the image plane 545-2.

Figure 5D:
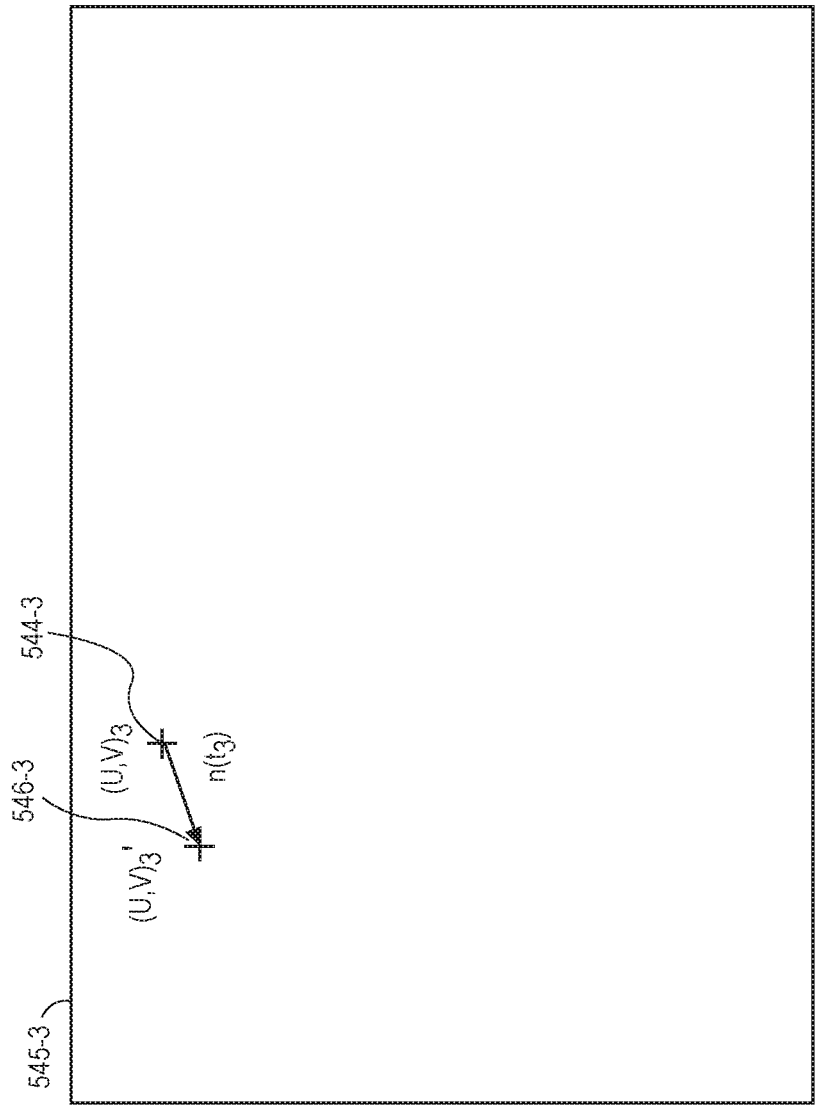

As is shown in FIG. 5D, where the camera 525 is located at a position $(x, y, z)_3$ and an orientation $(\varphi, \theta, \phi)_3$ at time $t_3$ in three-dimensional space, a location 544-3 of the synthetic object 580 within the image plane 545-3, or $(u, v)_3$, at time $t_3$ may be determined by projecting the point $P_3=(X, Y, Z)_3$ on the trajectory $T_{580}$ into the image plane 545-3. An adjustment term $n(t_3)$ may be determined for the location 544-3 based on a homography estimated for the image plane 545-3 from consecutive images captured at time $t_3$ and time $t_2$. The adjustment term $n(t_3)$ is intended to move the position 544-3 of the synthetic object 580 determined based on inertial measurement unit data to a more realistic location 546-3, or $(u, v)_3'$, within the image plane 545-3.

Figure 5E:
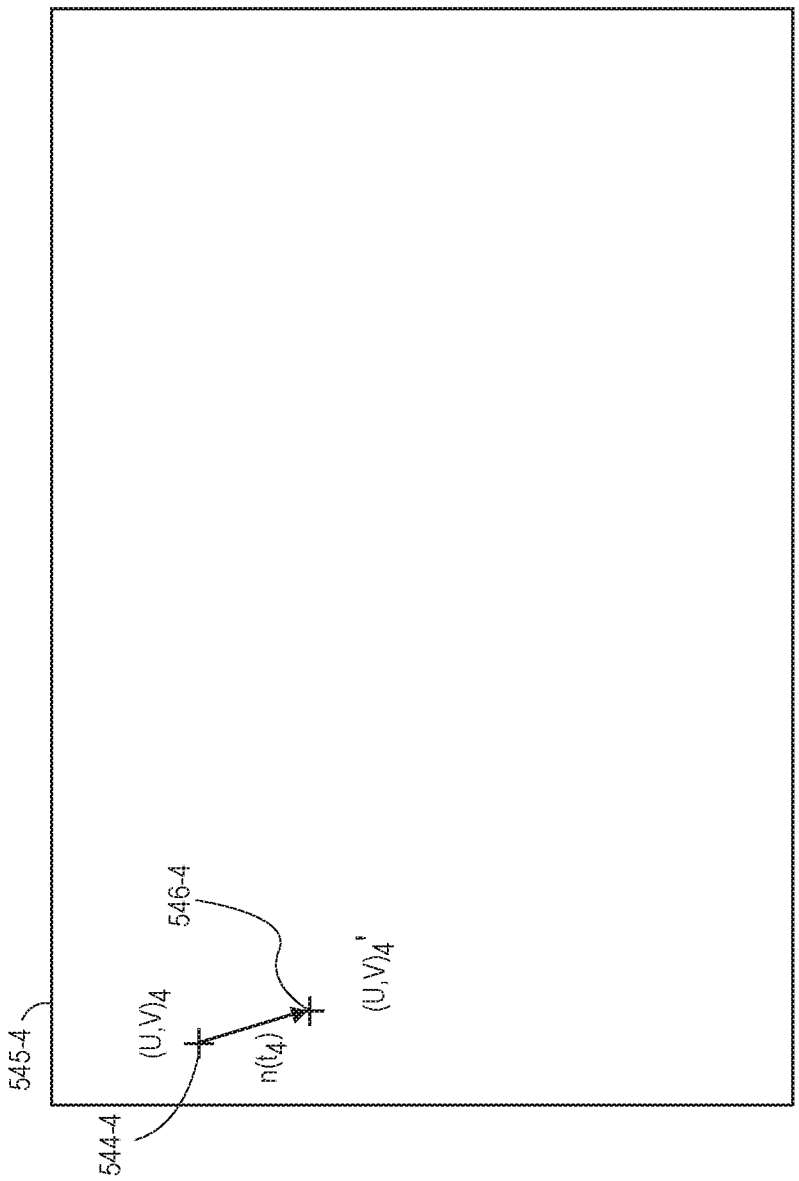

As is shown in FIG. 5E, where the camera 525 is located at a position $(x, y, z)_4$ and an orientation $(\varphi, \theta, \phi)_4$ at time $t_4$ in three-dimensional space, a location 544-4 of the synthetic object 580 within the image plane 545-4, or $(u, v)_4$, at time $t_4$ may be determined by projecting the point $P_4=(X, Y, Z)_4$ on the trajectory $T_{580}$ into the image plane 545-4. An adjustment term $n(t_4)$ may be determined for the location 544-4 based on a homography estimated for the image plane 545-4 from consecutive images captured at time $t_4$ and time $t_3$. The adjustment term $n(t_4)$ is intended to move the position 544-4 of the synthetic object 580 determined based on inertial measurement unit data to a more realistic location 546-4, or $(u, v)_4'$, within the image plane 545-4.

Figure 6:
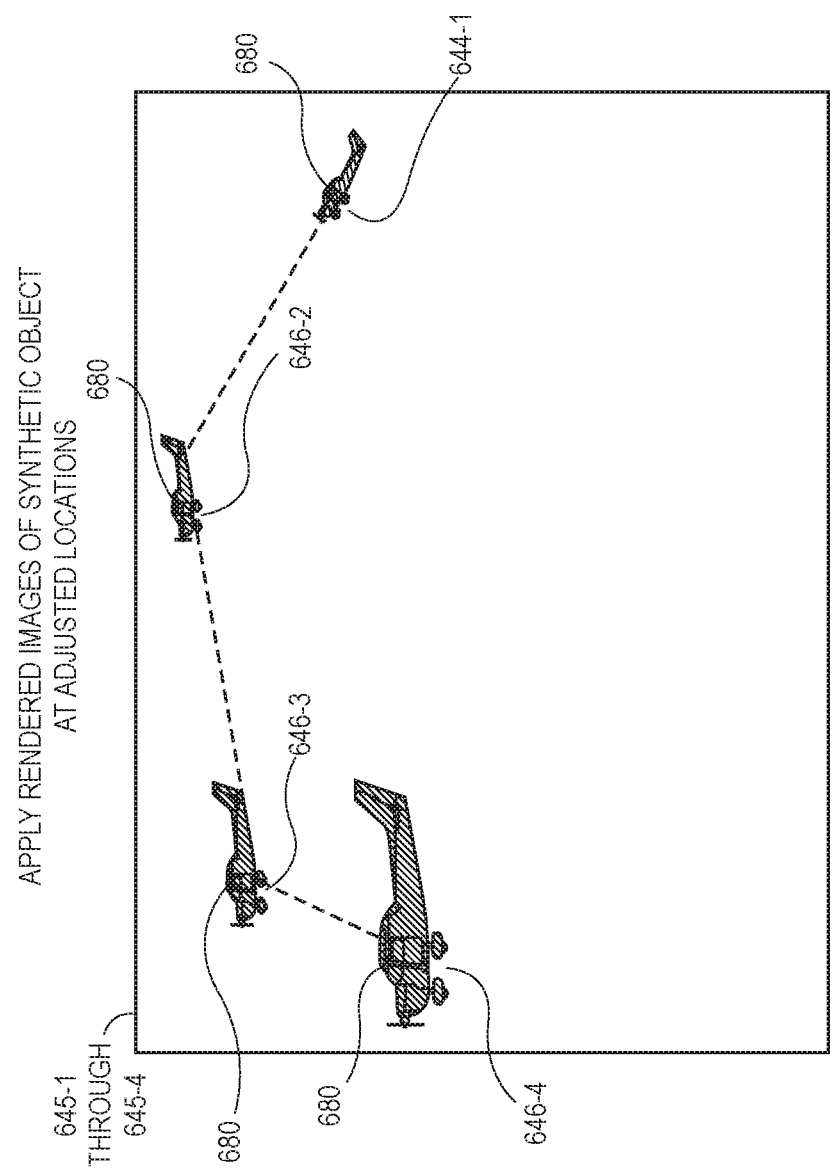
FIG. 6 is a view of aspects of one system for generating training data in accordance with embodiments of the present disclosure.

Two-dimensional images of a synthetic object may be generated according to any computer graphics technique, and applied at locations within an image plane at a given time where a synthetic object is intended to appear, including locations identified based on a trajectory of the synthetic object and a position and an orientation of a camera at the given time, as determined from inertial measurement unit data, or pixel-accurate locations that are determined based on apparent background motion between consecutive images. Referring to FIG. 6, a view of aspects of one system for generating training data in accordance with embodiments of the present disclosure is shown. Except where otherwise noted, reference numerals preceded by the number "6" shown in FIG. 6 indicate components or features that are similar to components or features having reference numerals preceded by the number "5" shown in FIGS. 5A through 5E, by the number "4" shown in FIG. 4, by the number "2" shown in FIG. 2 or by the number "1" shown in FIGS. 1A through 1H.

As is shown in FIG. 6, once locations 644-1, 646-2, 646-3, 646-4 of a synthetic object 680 within image planes of a camera are determined for a plurality of times $t_1$, $t_2$, $t_3$, $t_4$, two-dimensional images of the synthetic object 680 may be rendered and applied at such locations within such image planes. For example, the images may be rendered based on physical properties of an authentic object upon which the synthetic object 680 is based (e.g., an actual aerial vehicle that the synthetic object 680 is intended to mimic), as well as perspectives of the synthetic object 680 at such times, which may be determined based on an orientation of the synthetic object 680 with respect to a camera.

Figure 7:
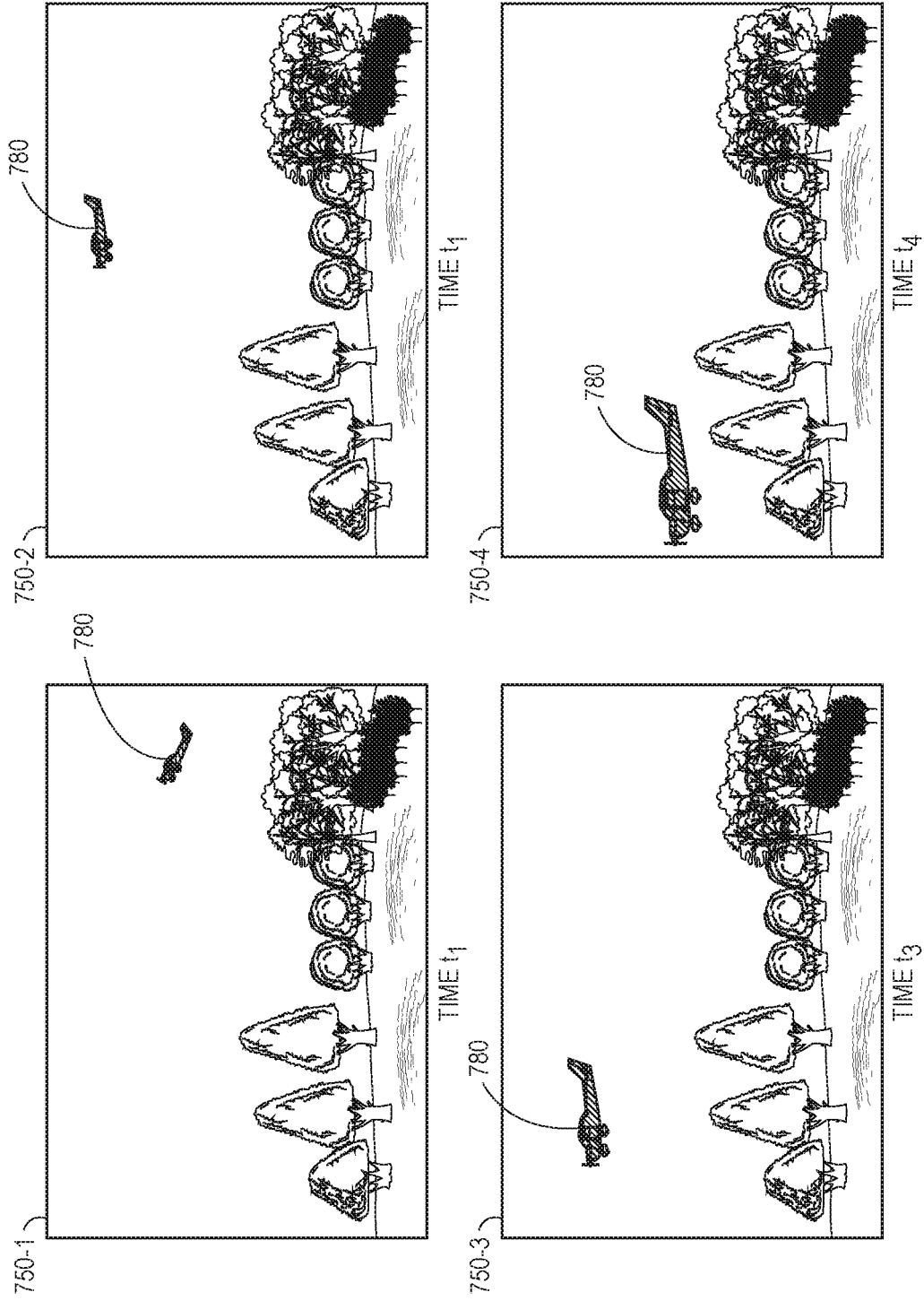
FIG. 7 is a view of aspects of one system for generating training data in accordance with embodiments of the present disclosure.

Rendered images of a synthetic object that are applied at specific locations within an image plane of a camera at specific times may be composited into background images captured by the camera at such times, e.g., by alpha-compositing, or alpha-blending, or in any other manner. Referring to FIG. 7, a view of aspects of one system for generating training data in accordance with embodiments of the present disclosure is shown. Except where otherwise noted, reference numerals preceded by the number "7" shown in FIG. 7 indicate components or features that are similar to components or features having reference numerals preceded by the number "6" shown in FIG. 6, by the number "5" shown in FIGS. 5A through 5E, by the number "4" shown in FIG. 4, by the number "2" shown in FIG. 2 or by the number "1" shown in FIGS. 1A through 1H.

As is shown in FIG. 7, a plurality of composite (or blended) images 750-1, 750-2, 750-3, 750-4 are formed by blending rendered images of a synthetic object at locations within image planes of a camera at specific times, such as the rendered images shown in FIG. 6, with background images captured by the camera at such times. The rendered images and the background images may be combined to form the composite images 750-1, 750-2, 750-3, 750-4 in any manner, such as by alpha compositing, alpha blending, or any other techniques. Moreover, in some embodiments, the locations of the synthetic object or the rendered images within the composite images 750-1, 750-2, 750-3, 750-4 (e.g., the locations 644-1, 646-2, 646-3, 646-4 shown in FIG. 6) may be stored in association with the respective composite images 750-1, 750-2, 750-3, 750-4, e.g., by any annotation techniques, such as in metadata of the composite images 750-1, 750-2, 750-3, 750-4, or in one or more separate data files or records. The composite images 750-1, 750-2, 750-3, 750-4 may be used to train a machine learning algorithm to detect and identify the synthetic object within imaging data, to determine whether the synthetic object is a threat, or to identify one or more corrective actions to be taken in the event that the synthetic object is identified as a threat.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Additionally, combinations, features or aspects of one or more of the embodiments discussed or described herein may be utilized in concert with any of the other embodiments discussed or described herein, even if such features or aspects are not expressly described herein as being associated with such other embodiments. For example, with regard to machine learning algorithms, systems or techniques discussed herein, the systems and methods of the present disclosure may be utilized to generate training data for use in training any type or form of machine learning algorithm, system or technique, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

Although some of the embodiments disclosed herein may reference unmanned aerial vehicles, e.g., for delivering payloads from warehouses or other like facilities to customers or other recipients, those of ordinary skill in the pertinent arts will recognize that the systems and methods disclosed herein are not so limited, and may be utilized to generating training data for training a machine learning algorithm, system or technique to be utilized by any type or form of vehicle (e.g., manned or unmanned) having fixed or rotating wings for any intended industrial, commercial, recreational or other use, as well as any other type or form of land-based, sea-based or air-based vehicle, station or object.

It should be understood that, unless otherwise explicitly or implicitly indicated herein, any of the features, capacities, attributes, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIGS. 3A, 3B and 3C, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
   a first aerial vehicle comprising:
   a camera; and
   an inertial measurement unit comprising at least one gyroscope and at least one accelerometer, at least one magnetometer and at least one position sensor; and
   at least one computer system in communication with the first aerial vehicle, wherein the at least one computer system is programmed with one or more sets of instructions that, when executed by the at least one computer system, cause the at least one computer system to perform a method comprising:
   receiving a first image from the first aerial vehicle, wherein the first image was captured by the camera at a first time;
   identifying a first position and a first orientation of the camera at the first time, wherein the first position and the first orientation are identified based at least in part on data captured by the inertial measurement unit at the first time;
   receiving a second image from the first aerial vehicle, wherein the second image was captured by the camera at a second time;
   identifying a second position and a second orientation of the camera at the second time, wherein the second position and the second orientation are identified based at least in part on data captured by the inertial measurement unit at the second time;
   generating a trajectory having a plurality of positions in three-dimensional space, wherein at least a first position of the trajectory is in a field of view of the camera at the first time and at least a second position of the trajectory is in the field of view of the camera at the second time;
   determining a first location within an image plane of the camera at the first time, wherein the first location corresponds to the first position of the trajectory at the first time;
   determining a second location within the image plane of the camera at the second time, wherein the second location corresponds to the second position of the trajectory at the second time;
   estimating a homography between the image plane of the camera at the first time and the image plane of the camera at the second time based at least in part on the first image and the second image;
   adjusting the second location within the image plane of the camera at the second time based at least in part on the homography;

rendering a third image, wherein the third image depicts a second aerial vehicle in the first location of the image plane at the first time;

rendering a fourth image, wherein the fourth image depicts the second aerial vehicle in the adjusted second location of the image plane at the second time;

generating a fifth image, wherein the fifth image is generated by compositing the first image and the third image; and generating a sixth image, wherein the sixth image is generated by compositing the second image and the fourth image.

2. The system of claim 1, wherein the method further comprises:

providing at least the sixth image to a machine learning algorithm as an input;

receiving an output from the machine learning algorithm in response to the input;

determining a comparison of the output to the adjusted second location within the image plane of the camera at the second time; and modifying the machine learning algorithm based at least in part on the comparison.

3. The system of claim 2, wherein the method further comprises:

programming a second aerial vehicle to execute the machine learning algorithm.

4. The system of claim 1, wherein the method further comprises:

tagging the first image with metadata identifying the first position and the first orientation of the camera at the first time; and tagging the second image with metadata identifying the second position and the second orientation of the camera at the second time.

5. The system of claim 1, wherein the homography is a linear mapping of at least one pixel within the image plane of the camera at the second time to the image plane of the camera at the first time, and wherein the at least one pixel corresponds to a static ground-based object depicted in each of the first image and the second image.

6. A method comprising:

capturing, by a camera provided aboard a first aerial vehicle, a first image at a first time;

determining, based at least in part on first data captured by an inertial measurement unit provided aboard the first aerial vehicle, a first position of the camera at the first time and a first orientation of the camera at the first time;

capturing, by the camera, a second image at a second time;

determining, based at least in part on second data captured by the inertial measurement unit, a second position of the camera at the second time and a second orientation of the camera at the second time;

generating a trajectory of a synthetic object, wherein the trajectory comprises a first position of the synthetic object at the first time and a second position of the synthetic object at the second time, wherein the first position of the synthetic object at the first time is within a field of view of the camera at the first time, and wherein the second position of the synthetic object at the second time is within the field of view of the camera at the second time;

estimating a homography between the first image and the second image;

selecting a first location of the synthetic object within the first image based at least on the trajectory;

selecting a second location of the synthetic object within the second image based at least in part on the trajectory and the homography;

generating a first composite image based at least in part on the first image and the first location of the synthetic object within the first image, wherein the first composite image comprises a first rendered image of the synthetic object at the first time located in the first location of the synthetic object within the first image;

generating a second composite image based at least in part on the second image and the second location of the synthetic object within the second image, wherein the second composite image comprises a second rendered image of the synthetic object at the second time in the second location of the synthetic object within the second image; and storing the first composite image and the second composite image in association with the first location and the second location in at least one data store.

7. The method of claim 6, further comprising:

providing at least the second composite image to a machine learning algorithm as an input;

receiving an output from the machine learning algorithm in response to the input; and modifying the machine learning algorithm based at least in part on the output.

8. The method of claim 6, wherein selecting the second location comprises:

projecting the second position of the synthetic object at the second time into an image plane of the camera at the second time;

determining a location within the image plane of the camera at the second time at which the second position of the synthetic object is projected therein;

calculating an adjustment vector based at least in part on the homography; and adjusting the location within the image plane of the camera at the second time based at least in part on the adjustment vector, wherein the second location of the synthetic object within the second image is selected based at least in part on the adjusted location within the image plane of the camera.

9. The method of claim 6, further comprising:

storing the first position and the first orientation of the camera at the first time in metadata of the first image; and storing the second position and the second orientation of the camera at the second time in metadata of the second image.

10. The method of claim 6, wherein the synthetic object is a synthetic aerial vehicle.

11. The method of claim 6, wherein the synthetic object corresponds to an authentic object, and wherein the method further comprises:

determining at least one physical attribute of the authentic object;

generating the first rendered image of the synthetic object at the first time based at least in part on the at least one physical attribute of the authentic object and the first position of the synthetic object at the first time; and generating the second rendered image of the synthetic object at the second time based at least in part on the at least one physical attribute of the authentic aerial vehicle and the second position of the synthetic object at the second time,
wherein the physical attribute is one of a shape, a size or a color of the authentic object.

12. The method of claim 11, wherein generating the second rendered image of the synthetic object comprises:
determining that the first position of the synthetic object is at a first distance from the camera at the first time; and
determining that the second position of the synthetic object is at a second distance from the camera at the second time,
wherein the second rendered image is generated by enlarging the first rendered image if the second distance is shorter than the first distance, and
wherein the second rendered image is generated by contracting the first rendered image if the first distance is longer than the second distance.

13. The method of claim 6, wherein the homography is a linear mapping of at least one pixel within an image plane of the camera at the second time to the at least one pixel within the image plane of the camera at the first time.

14. The method of claim 13, wherein the at least one pixel corresponds to a static ground-based object depicted in each of the first image and the second image.

15. The method of claim 6, wherein generating the second composite image comprises:
alpha-blending the second rendered image of the synthetic object at the second time into the second location of the synthetic object within the second image.

16. A method comprising:
capturing, by a camera provided aboard an aerial vehicle, a sequence of images at a plurality of times;
identifying data captured by an inertial measurement unit provided aboard the aerial vehicle at the plurality of times;
determining, based at least in part on the data, positions and orientations of the camera at each of the plurality of times;
identifying a trajectory of a synthetic object, wherein the trajectory comprises a plurality of points in three-dimensional space over at least some of the plurality of times;
determining, for each of the plurality of points, a location corresponding to the point within an image plane of the camera at one of the times, wherein determining the location corresponding to the point comprises projecting the point into the image plane of the camera at the one of the plurality of times;
estimating a homography for each pair of consecutive images of the sequence, wherein each of the homographies is a relation between at least one pixel of the image plane of the camera at the one of the times and the at least one pixel of the image plane of the camera at a preceding one of the images of the sequence;
adjusting each of the locations corresponding to the point within the image plane of the camera at the one of the plurality of times based at least in part on a corresponding one of the homographies;
generating, for each of the images of the sequence, a rendered image of the synthetic object based at least in part on the trajectory;
compositing, for each of the images of the sequence, the rendered image of the synthetic object into the one of the images of the sequence for which the rendered image was generated at the adjusted location; and
storing the composited images in association with the adjusted locations in at least one data store.

17. The method of claim 16, further comprising:
providing the composited images to a machine learning algorithm as inputs;
receiving outputs from the machine learning algorithm in response to the composited images; and
modifying the machine learning algorithm based at least in part on at least one of the outputs.

18. The method of claim 16, wherein the synthetic object corresponds to an authentic object, and
wherein the method further comprises:
determining at least one physical attribute of the authentic object; and
generating the rendered images of the synthetic object based at least in part on the at least one physical attribute of the authentic aerial vehicle and the trajectory of the synthetic object,
wherein the physical attribute is one of a shape, a size or a color of the authentic object.

19. The method of claim 16, wherein the at least one pixel depicts a ground-based feature in the preceding one of the images of the sequence.

20. The method of claim 16, wherein compositing the rendered images of the synthetic object comprises:
alpha-blending each of the rendered images into one of the images of the sequence for which the rendered images were generated at the adjusted location.

* * * * *